(12) United States Patent
Murade

(10) Patent No.: US 7,196,353 B2
(45) Date of Patent: Mar. 27, 2007

(54) ELECTRO-OPTICAL DEVICE AND ELECTRONIC APPARATUS

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 343 days.

(21) Appl. No.: 10/917,504

(22) Filed: Aug. 13, 2004

(65) Prior Publication Data

US 2005/0078240 A1   Apr. 14, 2005

(30) Foreign Application Priority Data

Aug. 29, 2003   (JP)   ............................. 2003-306812

(51) Int. Cl.
*H01L 29/04* (2006.01)

(52) U.S. Cl. .................... 257/59; 257/72; 257/E27.131; 349/111

(58) Field of Classification Search .................. 257/59, 257/72, E29.273, E27.132, E27.131; 349/110, 349/111

See application file for complete search history.

(56) References Cited

U.S. PATENT DOCUMENTS 6,795,049 B2   9/2004   Toyoshima et al.

2002/0186195 A1 * 12/2002 Maruoka et al. .............. 345/87
2003/0076459 A1   4/2003   Murade

FOREIGN PATENT DOCUMENTS

| JP | A 9-50044 | | 2/1997 |
| JP | A-09-050044 | | 2/1997 |
| JP | 2001042357 A | * | 2/2001 |
| JP | A 2003-177427 | | 6/2003 |
| KR | 2002-062171 A | | 7/2002 |
| KR | 2003-0029037 | | 4/2003 |

* cited by examiner

Primary Examiner—Minh-Loan Tran
(74) Attorney, Agent, or Firm—Oliff & Berridge, PLC

(57) ABSTRACT

Aspects of the invention can provide an electro-optical device that displays an image in good quality by an electro-optical device, such as a liquid crystal device, even in the proximity of edges of the image displayed. The electro-optical device can include a plurality of pixel electrodes, and wires and electronic elements that are used to drive the pixel electrodes, provided on a substrate. The plurality of pixel electrodes can be arranged in an image display area and a dummy area. The pixel electrodes disposed in the dummy area function as dummy pixel electrodes. Furthermore, on the substrate, dummy-pixel light-shielding films that cover at least part of opening regions of the dummy pixel electrodes are provided.

15 Claims, 13 Drawing Sheets

F I G. 1 2
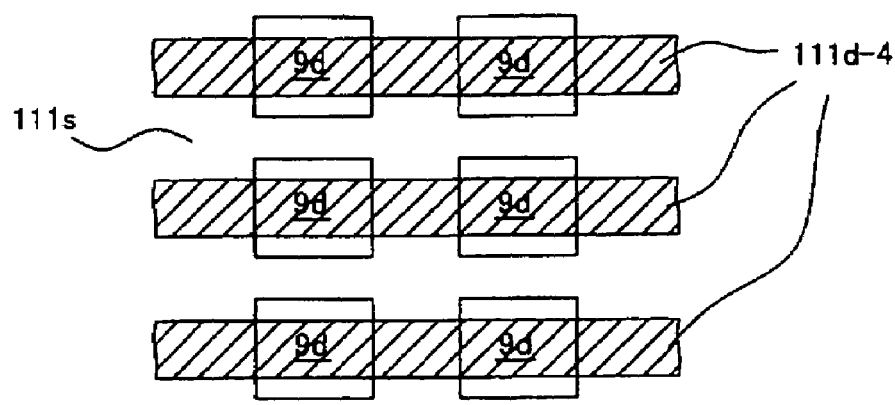
F I G. 1 3
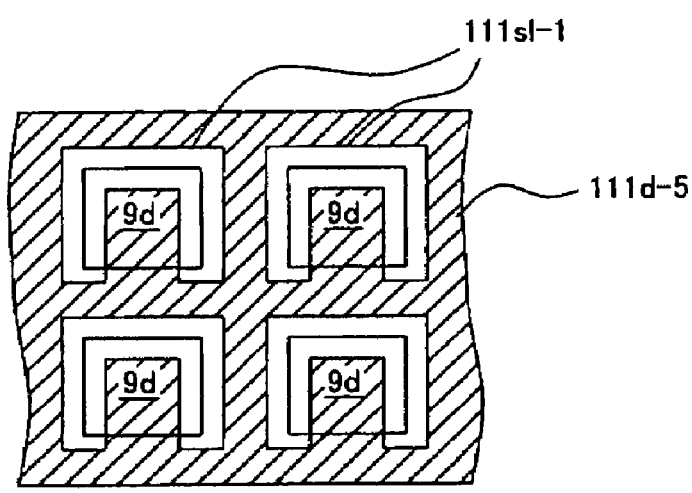

ELECTRO-OPTICAL DEVICE AND ELECTRONIC APPARATUS

BACKGROUND OF THE INVENTION

1. Field of Invention

Aspects of the invention relates to the technical field of electro-optical devices, such as liquid crystal devices, and electronic apparatuses, such as liquid crystal projectors including such electro-optical devices.

2. Description of Related Art

Related electro-optical device of this type can include a plurality of pixel electrodes arranged in a matrix shape, for example, on a thin-film transistor (TFT) array substrate, and a planar area where the plurality of pixel electrodes is arranged is used as an image display area. The image display area can have a frame defined, for example, by an internal light-shielding film referred to as a black matrix or a black mask, formed on the TFT array substrate. Alternatively or in addition to the internal light-shielding film, a frame-shaped light-shielding film can be formed on an opposing substrate.

However, of the plurality of pixel electrodes arranged in a plane, it can be difficult to achieve favorable electro-optical operation by pixel electrodes disposed along top and bottom and right and left edges or in the proximity thereof just as by pixel electrodes disposed in the proximity of the center. Thus, of the plurality of pixel electrodes arranged in a plane, pixel electrodes arranged in the proximity of the edges are used as dummy pixel electrodes. In other words, a frame-shaped dummy area is defined in the periphery of the image display area where an image is actually displayed, and the pixel electrodes in the dummy area are matrix-driven just as the pixel electrodes in the image display area but are not used for actual display. For example, a black image is displayed over the entire dummy area so as to form black edges surrounding a projected image.

SUMMARY OF THE INVENTION

However, the related techniques of providing a dummy area as described above suffer the following problems. From the sides of a frame-shaped light-shielding film included in a substrate or formed on an opposing substrate, components of incident light that are diagonal with respect to the substrate enter the dummy area. For example, even when lights from an optical source for a projector are parallel to each other in an optical system, light incident on an electro-optical device includes diagonal components of a light amount that cannot be neglected. For example, in some cases, components having incident angles of 10 to 15 degrees with respect to a normal angle are included by approximately 10%. Furthermore, components that are diagonal with respect to the substrate, included in returning light such as light reflected by a bottom surface of the substrate of the electro-optical device or light that is emitted from another electro-optical system and that transmits through a coupling optical system in a case where a plurality of electro-optical devices can be used in combination as light bulbs, enters the dummy area. Furthermore, multiple reflection or stray components that are diagonal with respect to the substrate, caused by reflection or multiple reflection of incident light or returning light by concavities and convexities on top surfaces or bottom surfaces of wires in a laminated structure on the substrate or by concavities and convexities on top surfaces or bottom surfaces of electronic elements on the substrate, enter the dummy area.

When various lights that do not contribute to display, such as diagonal lights, enter the dummy area, the lights that do not contribute to display are mixed into light emitted for display from the image display area, through opening regions of dummy pixel electrodes that are constructed and driven similarly to pixel-electrodes. This results in a technical problem that picture quality is degraded, particularly in the proximity of the edges of a displayed image. It has been confirmed that, whether or not the dummy electrodes are driven so that the dummy area will be entirely displayed in black, degradation in picture quality occurs. For example, when a blackish image is displayed in the image display area, the image in the proximity of the edges is blurred to get whitish. On the other hand, when a whitish image is displayed, the image in the proximity of the edges is blurred to get blackish.

Aspects of the invention can provide an electro-optical device that allows an image to be displayed in good quality even in the proximity of the edges of the image displayed, and various electronic apparatuses including the same. The electro-optical device can include a plurality of pixel electrodes provided above a substrate, either or both wires and electronic elements that are used to drive the plurality of pixel electrodes, an image display area where a first set of pixel electrodes among the plurality of pixel electrodes is located, and a dummy area where a second set of pixel electrodes among the plurality of pixel electrodes is located. The dummy area having a frame-like shape and surrounding the image display area; and a dummy-pixel light-shielding film that covers at least part of opening regions of the pixel electrodes that function as dummy pixel electrodes is provided on the substrate.

In the electro-optical device according to an aspect of the invention, image signals and scanning signals are supplied to electronic elements such as pixel-switching TFTs or thin-film diodes TFDs via wires such as data lines and scanning lines. The image signals and scanning signals are selectively supplied to the pixel electrodes to achieve active-matrix driving. In other words, an image is displayed in an image display area where a plurality of pixel electrodes is arranged in a plane. At this time, similarly to the image display area, image signals and scanning signals are supplied to pixel electrodes that function as dummy pixel electrodes, so that active-matrix driving is executed in the dummy area. Thus, pixels that are not fully driven, for example, in the proximity of the edges of the image display area in active-matrix driving where liquid crystal is not fully driven, are excluded from the image display area where an image is actually displayed. Accordingly, an image is displayed in good quality even at the edges of the image display area.

Furthermore, the dummy-pixel light-shielding film can be provided on the substrate, covering at least part of the opening regions of the pixel electrodes that function as dummy pixel electrodes. Thus, even when (i) a diagonal component of incident light coming from the sides of the frame-shaped light-shielding film, (ii) a diagonal component in returning light such as light reflected by a bottom surface of the substrate, or (iii) a multiple reflection or stray component that occurs in a lamination structure on the substrate enters the dummy area, the dummy-pixel light-shielding film effectively prevents these components from being mixed in display light through the opening regions of the respective dummy pixel electrodes. Thus, degradation in picture quality in the proximity of the edges of a displayed image due to light penetration or light leakage in the dummy area is suppressed. Thus, the image displayed has clear edges. In particularly, in the case of a projector, the edges of a projected image can be represented by very clear black or gray. Thus, compared with conventional images displayed with blurred edges, images are perceived by the human vision as considerably better.

Since the opening regions of the dummy pixel electrodes are covered to block light, image signals supplied to the dummy pixel electrodes need not be black image signals and may be intermediate-level image signals. Furthermore, image signals supplied to the dummy pixel electrodes need not be image signals at fixed voltage level and may be changing or moving-picture image signals.

When the construction described above is employed, if the opening regions of the respective pixels are diagonally on the order of ten to twenty μm, even when the dummy-pixel light-shielding film has gaps on the order of several μm along the edges of the respective opening regions or slits having a width on the order of several μm, the dummy-pixel light-shielding film sufficiently block light with regard to the opening regions of the dummy pixels. Furthermore, even when the dummy-pixel light-shielding film is formed in parts or very limited parts of the opening regions of the respective dummy pixels so as to provide larger gaps, light is blocked to certain extent.

Accordingly, the exemplary electro-optical device according to the invention allows an image to be displayed in good quality even in the proximity of the edges of the image displayed.

In a mode of the electro-optical device according to the present invention, the dummy-pixel light-shielding film is formed as island-shaped segments in the dummy area. According to this mode, the opening regions of the respective dummy pixels are covered by the dummy-pixel light-shielding films formed as island-shaped segments in the dummy area. Thus, for example, even when the dummy-pixel light-shielding films are composed of a light-shielding film material, such as a film of a high melting point metal, having a thermal expansion coefficient that is different from a thermal expansion coefficient of materials of the substrate, interlayer insulating films, other conductive layers or semiconductor layers, and other associated parts, stress that occurs in the proximity of the dummy-pixel light-shielding films during manufacturing involving high-temperature processing or low-temperature processing or after manufacturing is alleviated, and this serves to prevent occurrence of cracks. Furthermore, even though the dummy-pixel light-shielding films are formed as island-shaped segments, by fully covering the opening regions of the respective dummy pixels, that is, by locating gaps only in non-opening regions of the respective dummy pixels, light is blocked substantially the same as in a case where a dummy-pixel light-shielding film is formed over, the entire dummy area, on condition that manufacturing error or displacement does not exist. Also, for example, if the opening regions of the respective dummy pixels is diagonally on the order of ten to twenty μm, even when dummy-pixel light-shielding films are formed as island-shaped segments with gaps on the order of several μm along the edges of the respective opening regions, the dummy-pixel light-shielding films sufficiently block light with regard to the opening regions of the respective dummy pixels.

Island-shaped segments, in relation to the invention, may refer to island-shaped segments respectively associated one by one with the dummy pixel electrodes, or relatively larger island-shaped segments each associated with a plurality of dummy pixel electrodes. Furthermore, island-shaped segments may be square or rectangular segments, rounded rectangular segments, or polygonal segments such as hexagonal segments or octagonal segments.

Furthermore, when the dummy-pixel light-shielding films are formed as island-shaped segments, the individual dummy-pixel light-shielding films can be electrically insulated from each other. Thus, it is possible to form wires, electrodes, and other associated parts in the same layer.

Alternatively, in another mode of the electro-optical device according to the present invention, the dummy-pixel light-shielding film is formed over the entire dummy area. According to this mode, the opening regions of the respective dummy pixels are fully covered by the dummy-pixel light-shielding film formed over the entire dummy area. Thus, light penetration or light leakage in the dummy area is more fully prevented.

When the dummy-pixel light-shielding film is formed over the entire dummy area, electrical connection over the entire dummy-pixel light-shielding film is maintained. Thus, the dummy-pixel light-shielding film can be used as a single wire, such as a capacitor line or a grounding line.

Alternatively, in another mode of the electro-optical device according to the present invention, the dummy-pixel light-shielding film is formed as stripe-patterned segments in the dummy area. According to this mode, the opening regions of the respective dummy pixels are covered by the dummy-pixel light-shielding films formed as stripe-patterned segments in the dummy area. Thus, for example, even when the dummy-pixel light-shielding films are composed of a light-shielding film material, such as a film of a high melting point metal, having a thermal expansion coefficient that is different from a thermal expansion coefficient of materials of the substrate, interlayer insulating films, other conductive layers or semiconductor layers, and other associated parts, stress that occurs in the proximity of the dummy-pixel light-shielding films during manufacturing involving high-temperature processing or low-temperature processing or after manufacturing is alleviated, and this serves to prevent occurrence of cracks.

Furthermore, even though the dummy-pixel light-shielding films are formed as stripe-patterned segments, by fully covering the opening regions of the respective dummy pixels, that is, by locating gaps only in non-opening regions of the respective dummy pixels, light is blocked substantially the same as in a case where a dummy-pixel light-shielding film is formed over the entire dummy area, on condition that manufacturing error or displacement does not exist. Also, even when dummy-pixel light-shielding films are formed as stripe-patterned segments with gaps on the order of several μm with respect to the respective opening regions, the dummy-pixel light-shielding films sufficiently block light with regard to the opening regions of the respective dummy pixels.

Stripe patterned, in relation to the invention, can refer to, for example, a stripe pattern extending along the rows or columns of the pixel electrodes. For example, the dummy-pixel light-shielding films may be formed of part of wires such as the scanning lines or the data lines. Since the dummy-pixel light-shielding films are stripe patterned, the dummy-pixel light-shielding films can be used effectively as part of wires that are not short circuited with each other. Furthermore, the dummy-pixel light-shielding films may be formed as stripe-patterned segments each having a larger width and including a plurality of pixel rows or pixel columns.

Alternatively, in another mode of the electro-optical device according to the invention, the dummy-pixel light-shielding film has slits. According to this mode, the opening regions of the respective dummy pixels are covered by the dummy-pixel light-shielding film, for example, formed over the entire dummy area or as island-shaped segments in the dummy area. The dummy-pixel light-shielding film has slits, i.e., penetrating holes having an elongated shape. Thus, for example, stress that occurs in the proximity of the dummy-pixel light-shielding film during manufacturing involving high-temperature processing or low-temperature processing or after manufacturing is alleviated, and this serves to prevent occurrence of cracks. Preferably, a large number of slits is provided for alleviating stress over the entire dummy area for each dummy pixel or each set of a plurality of dummy pixels. Even though the slits are provided, by fully covering the opening regions of the respective dummy pixels, that is, by locating the slits only in non-opening regions of the respective dummy pixels, light is blocked substantially the same as in a case where a dummy-pixel light-shielding film is formed over the entire dummy area, on condition that manufacturing error or displacement does not exist. Also, even when slits having a width on the order of several µm are provided in the respective opening regions, the dummy-pixel light-shielding film sufficiently block light with regard to the opening regions of the respective dummy pixels.

The electrical connection over the entire dummy-pixel light-shielding film is not broken just by forming the slits. Thus, the dummy-pixel light-shielding film can be used as a single wire, such as a capacitor line or a grounding line. The slits may be elongated in a column direction or a row direction, or slits elongated in a column direction and slits elongated in a row direction may be mixed regularly or irregularly.

In another mode of the electro-optical device according to the present invention, the dummy-pixel light-shielding film is formed on a flat surface of the substrate, directly or via a flat interlayer insulating film. According to this mode, since the dummy-pixel light-shielding film is formed flatly on a flat surface of the substrate, even when a diagonal light or the like is incident on a surface of the dummy-pixel light-shielding film and is mixed in a display light or outgoing light, light reflected by the surface of the dummy-pixel light-shielding film does not have an interference pattern caused by a pattern of concavities and convexities on the reflecting surface. More specifically, since other wires, electrodes, electronic elements, and other associated parts exist in lower layers, when a diagonal light or the like is reflected by a reflecting film having concavities and convexities on the surface thereof, generally, an interference pattern occurs in accordance with wiring pitch or the like, and a certain pattern could appear in the proximity of the edges of an image displayed. Obviously, the pattern appearing in the proximity of the edges of the image displayed often highly visible, causing degradation in picture quality.

Therefore, use of a flat dummy-pixel light-shielding film in this mode is very favorable for suppressing degradation in picture quality due to interference by light reflected by the surface thereof or diffracted light. In another mode of the electro-optical device according to the invention, the dummy-pixel light-shielding film is formed under the either or both wires and electronic elements. According to this mode, the dummy-pixel light-shielding film effectively prevents reflection of returning light on a bottom surface of the electronic elements or wires. For example, assuming that the thickness of a polysilicon film that functions as a semiconductor layer of a thin-film transistor is approximately 40 nm, it is possible that returning light is reflected by the polysilicon film depending on the wavelength of the returning light. When the returning light is reflected in the dummy area, picture quality is degraded in the proximity of the edges of an image displayed. According to this mode, returning light or the like is blocked by the dummy-pixel light-shielding film before reaching the wires or electronic elements. Therefore, degradation in picture quality in the proximity of the edges of an image displayed is suppressed.

In addition, since wiring patterned in lower layers can be saved as the dummy-pixel light-shielding film is located lower in the multilayer structure on the substrate, it becomes easier to form the flat dummy-pixel light-shielding film.

In another mode of the electro-optical device according to the invention, the either or both wires and electronic elements includes thin-film transistors that control switching of the pixel electrodes, and scanning lines and data lines connected to the thin-film transistor. Furthermore, a lower light-shielding film that covers, from a lower layer side, at least channel regions of the thin-film transistors is provided, the lower light-shielding film being composed of the same film material as the dummy-pixel light-shielding film.

According to this mode, occurrence of a light leak current at a pixel-switching TFT due to returning light is effectively prevented by the lower light-shielding film composed of the same film material as the dummy-pixel light-shielding film. Thus, change in the characteristics of the pixel-switching TFT due to returning light is prevented, allowing an image to be displayed in good quality. Since the lower light-shielding film and the dummy-pixel light-shielding film are composed of the same film material, it is possible to simplify the lamination structure on the substrate and a manufacturing method thereof.

In a mode relating to the lower light-shielding film, the lower light-shielding film may also function as at least part of the scanning lines. Accordingly, since the scanning lines on the substrate are formed in a lower layer than the pixel-switching TFTs, scanning signals are supplied stably. Furthermore, in upper layers of the pixel-switching TFTs, storage capacitors, capacitor lines, data lines, an upper light-shielding film, or other parts, can be formed without consideration of the scanning lines.

Alternatively, in a mode relating to the lower light-shielding film, capacitor lines used to connect storage capacitors to the pixel electrodes are provided on the substrate, the capacitor lines being composed of the same conductive film material as the dummy-pixel light-shielding film. Accordingly, since the scanning lines on the substrate are formed in a lower layer than the pixel-switching TFTs, scanning signals are supplied stably. Furthermore, in upper layers of the pixel-switching TFTs, scanning lines, data lines, an upper light-shielding film, or other parts, can be formed without consideration of the capacitor lines.

In another mode of the exemplary electro-optical device according to the invention, an image-signal supplying circuit that supplies image signals to the data lines, and a scanning-signal supplying circuit that supplies scanning signals to the scanning lines are further provided on the substrate. At least one of the image-signal supplying circuit and the scanning-signal supplying circuit supplies a signal that is output first from an end thereof to a dummy data line or scanning line that is not connected to the thin-film transistors. According to this mode, the signal output first, whose waveform, voltage, pulse width, or the like, is most unstable due to the nature of a circuit that sequentially outputs signals transferred by a shift register or the like implementing the scanning-line driving circuit or the data-line driving circuit, is supplied to a dummy data line or scanning line. The dummy data line or scanning line is not connected to a thin-film transistor. Thus, the signal output first is not used and is discarded for actually driving pixels.

Without limitation to one line to which a signal output first is supplied, a relatively small number of dummy lines may be provided, such as two lines to which first two signals are supplied, or three lines to which first three signals are supplied.

In another mode of the electro-optical device according to the present invention, the dummy-pixel light-shielding film can be connected to a constant potential source or a constant potential wire. According to this mode, the potential of the dummy-pixel light-shielding film is stable, so that variation of the potential does not substantially cause negative effect on pixel electrodes, wires, or other parts. Preferably, the constant potential wire is a ground potential wire of the data-line driving circuit, which is usually connected relatively close to the dummy pixel electrodes considering the layout on the substrate. Alternatively, a dedicated constant potential source or constant potential wire may be provided.

In another mode of the electro-optical device according to the invention, the dummy-pixel light-shielding film is at a floating potential. This mode is convenient when the dummy-pixel light-shielding film is formed as island-shaped segments. As long as the dummy-pixel light-shielding film is at an interlayer distance from other conductive layers or semiconductor layers, the dummy-pixel light-shielding film, even if it is at a floating potential, does not negatively affect other parts. Furthermore, when the capacitance of the dummy-pixel light-shielding film is large, even if the dummy-pixel light-shielding film is at a floating potential, it is possible to maintain a stable potential. Thus, the dummy-pixel light-shielding film may be at a floating potential when, for example, the dummy-pixel light-shielding film is formed over the entire dummy area or as stripe-patterned segments.

In another mode of the electro-optical device according to the invention, an image-signal supplying device that supplies image signals to the plurality of pixel electrodes is further provided. The image-signal supplying means supplies intermediate-level image signals to the pixel electrodes that function as dummy pixel electrodes. According to this mode, the image-signal supplying means supplies intermediate-level image signals to the dummy pixel electrodes. When image signals for displaying black are supplied to dummy pixel electrodes, white ghost is likely to occur in a dummy area, i.e., at the edges of an image display area. Furthermore, assuming black corresponds to 5 V in the normally white mode, when image signals at intermediate levels on the order of 2 to 4 volts are supplied as dummy image signals, occurrence of such white ghost is suppressed. In particular, it has been confirmed that, in the case of simultaneous driving where n image signal (n is a natural number not smaller than 2) obtained by serial-parallel conversion are supplied simultaneously to n data lines, when intermediate-level or white image signals are supplied to dummy pixel electrodes, occurrence of such ghost is suppressed. Accordingly, according to the invention, by supplying intermediate-level image signals as dummy image signals, picture quality in the proximity of the edges of an image displayed can be further improved.

The image-signal supplying device may be included in the substrate or attached externally.

In another exemplary mode of the electro-optical device according to the invention, an opposing substrate disposed opposing the substrate so as to sandwich an electro-optical material with the substrate, and a frame-shaped light-shielding film disposed on the opposing substrate in an area opposing the dummy area are further provided. According to this mode, an electro-optical device, such as a liquid crystal device, in which an electro-optical material such as a liquid crystal is sandwiched between a pair of substrate and opposing substrate, which exhibits good picture quality even in the proximity of the edges of an image displayed, can be constructed. Since the dummy-pixel light-shielding film is provided in the dummy area, the frame-shaped light-shielding film associated with the opposing substrate may be formed in a smaller size. Thus, it is possible to effectively avoid narrowing the opening regions of the respective pixels due to inappropriate bonding of the substrates. Alternatively, the frame-shaped light-shielding film associated with the opposing substrate may be formed in a large size, thereby defining the opening regions of the respective pixels.

An exemplary electronic apparatus according to the invention comprises the electro-optical device according to the invention (including various modes thereof). Since the electronic apparatus according to the invention can include the electro-optical device according to the invention, various electronic apparatuses that allow images to be displayed in good quality, such as projection display apparatuses, television receivers, cellular phones, electronic notebooks, word processors, view-finder or monitor-direct-viewing video tape recorders, workstations, video telephones, POS terminals, touch panels, and the like can be constructed.

The electro-optical device according to the invention can be implemented as, for example, a liquid crystal device, an electrophoresis device, such as electronic paper, or an electron emitting device such as a field emission display or a surface-conduction electron-emitter display.

The above-described and other operations and advantages of the invention will become apparent from the following description of the exemplary embodiments.

BRIEF DESCRIPTION OF THE DRAWINGS

The invention will be described with reference to the accompanying drawings, wherein like numerals reference like elements, and wherein:

FIG. 12 is a plan view showing a planar pattern of lower light-shielding films in a dummy area in a fourth exemplary embodiment of the invention;

FIG. 13 is a plan view showing a planar pattern of a lower light-shielding film in a dummy area in a fifth exemplary embodiment of the invention;

DETAILED DESCRIPTION OF PREFERRED EMBODIMENTS

Exemplary, embodiments of the invention will be described with reference to the drawings. In the embodiments described below, electro-optical devices according to the invention are implemented as liquid-crystal devices.

Figure 1:
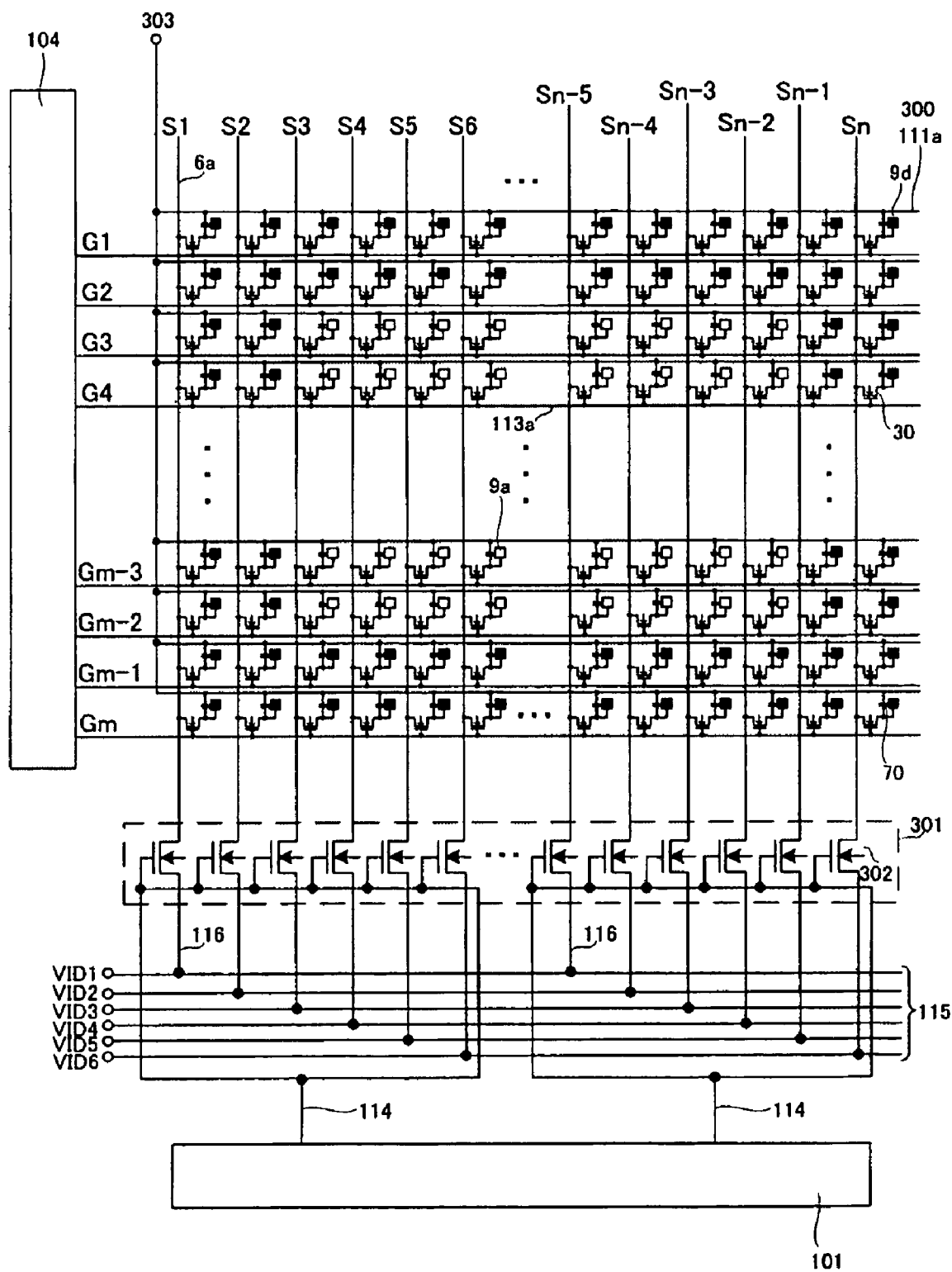
FIG. 1 is an exemplary circuit diagram showing an equivalent circuit of various elements and wires forming an image display area in an electro-optical device according to an exemplary embodiment of the invention, together with peripheral driving circuits.
Figure 2:
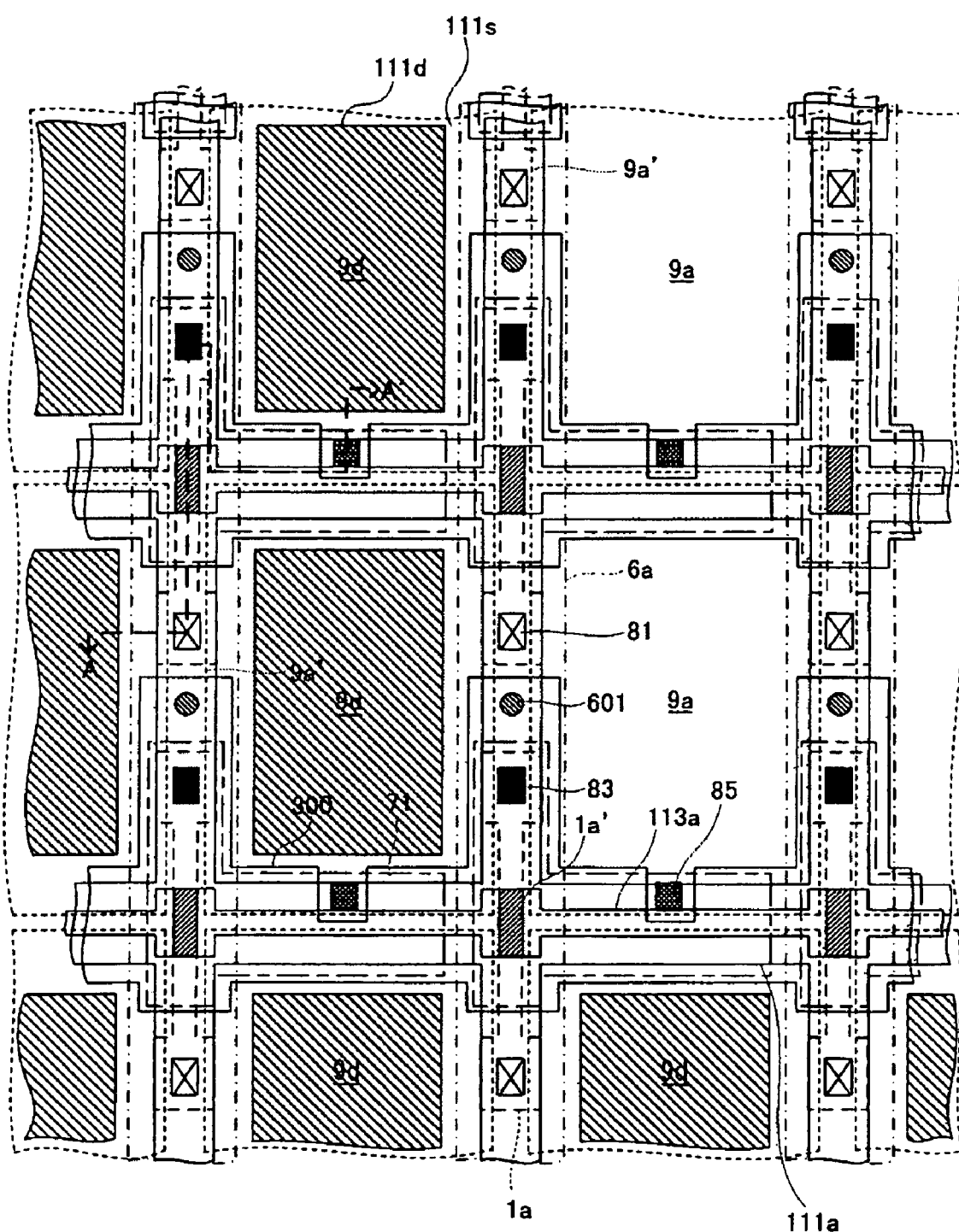
FIG. 2 is a plan view of a plurality of adjacent pixels on a TFT array substrate in an electro-optical device according to a first embodiment of the invention, where data lines, scanning lines, pixel electrodes, and other associated parts are formed.
Figure 3:
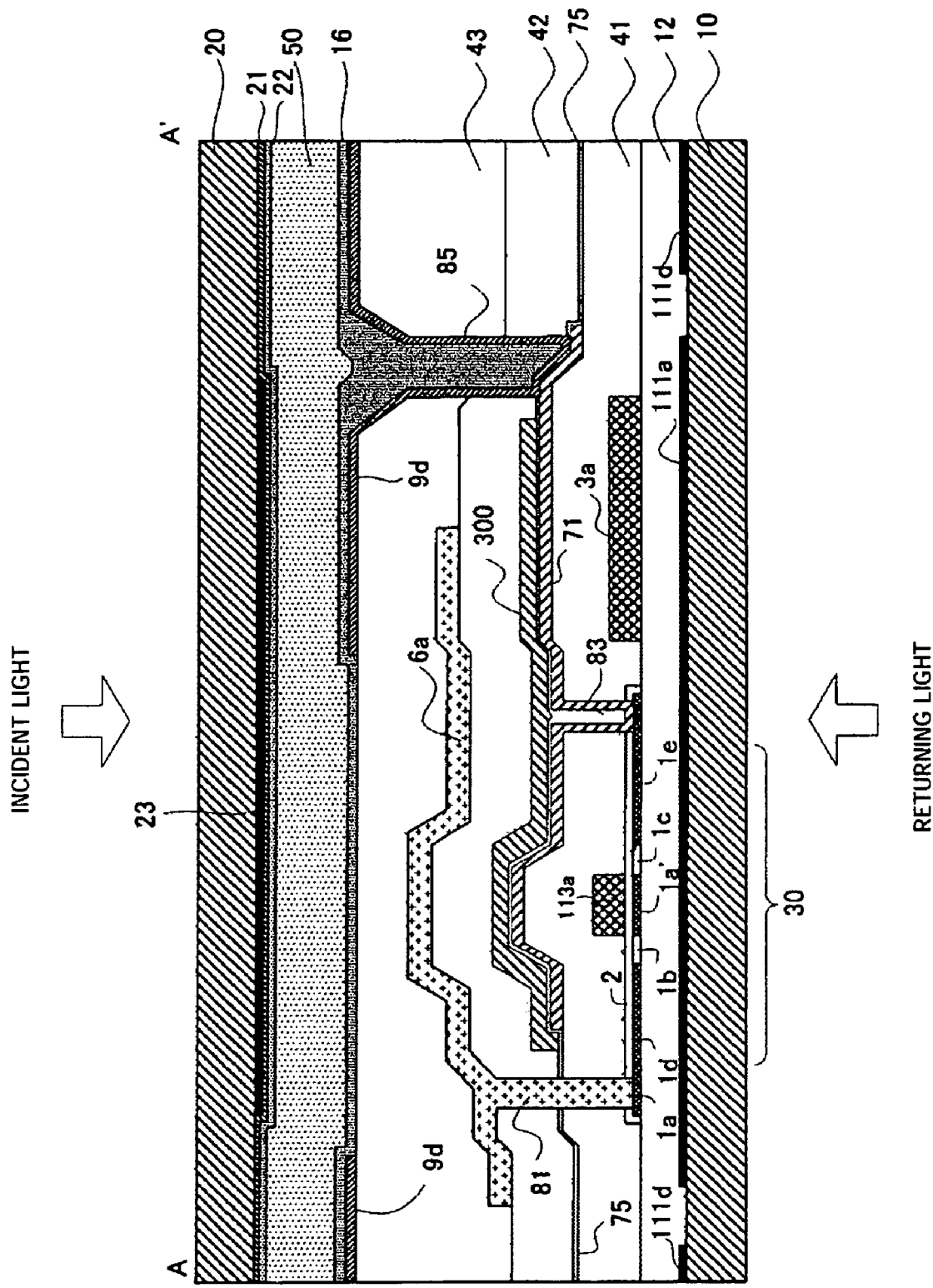
FIG. 3 is a sectional view taken along a line A–A' in FIG. 2.
Figure 4:
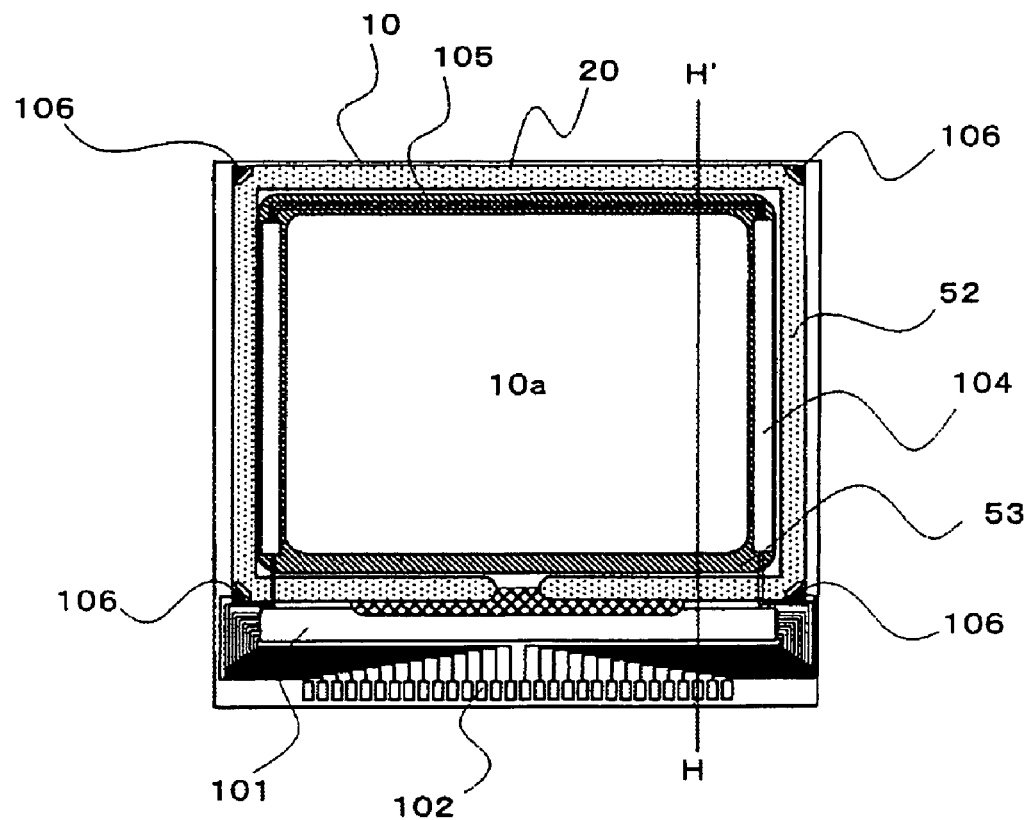
FIG. 4 is a plan view of a TFT array substrate and elements formed thereon, as viewed from an opposing substrate.
Figure 5:
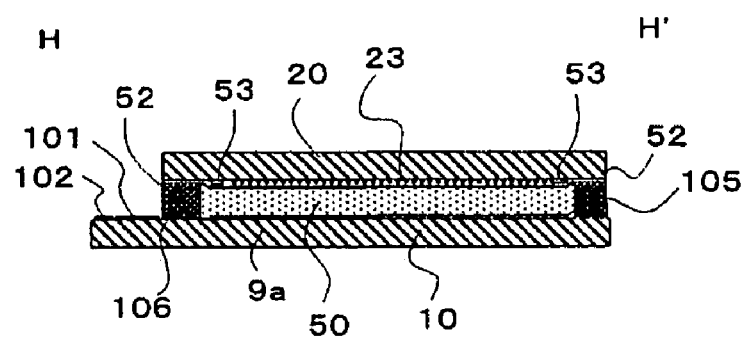
FIG. 5 is a sectional view taken along a line H–H' in FIG. 4.
Figure 6:
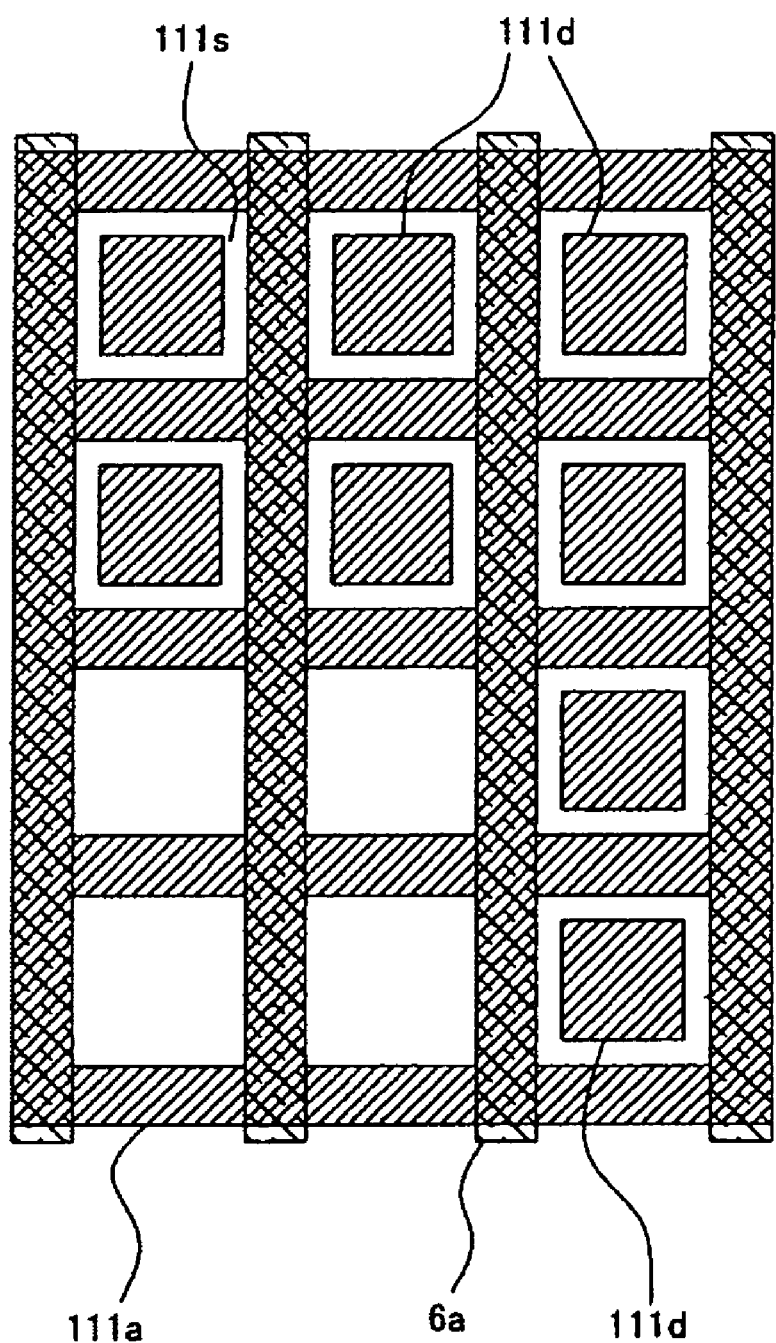
FIG. 6 is a partially enlarged plan view showing a light-shielding pattern in a dummy area.

First, an electro-optical device according to a first exemplary embodiment of the invention will be described with reference to FIGS. 1 to 6. FIG. 1 is an exemplary circuit diagram showing an equivalent circuit of various elements and wiring of a plurality of pixels arranged in a matrix shape to form an image display area of the electro-optical device, together with peripheral driving circuits. FIG. 2 is a plan view of a plurality of pixels adjacent to each other on a TFT array substrate on which data lines, scanning lines, pixel electrodes, and other associated parts are formed. FIG. 3 is a sectional view taken along a line A–A' in FIG. 2. FIG. 4 is a plan view of the TFT array substrate with elements formed thereon, as viewed from an opposing substrate. FIG. 5 is a sectional view taken along a line H–H' in FIG. 4. FIG. 6 is a partially enlarged plan view showing a light-shielding pattern in a dummy area. In FIGS. 3 and 5, layers and parts are shown in different scales so as to allow recognition of the layers and parts in the figures.

Referring to FIG. 1, an image display area of the electro-optical device according to this embodiment is formed by a plurality of pixels arranged in a matrix shape. Each of the plurality of pixels has a pixel electrode 9a and a TFT 30 that controls switching of the pixel electrode 9a. The source of the TFT 30 is electrically connected to a data line 6a that is used to supply an image signal. The gate of the TFT 30 is electrically connected to a scanning line 113a that is used to supply a scanning signal. The drain of the TFT 30 is electrically connected to the pixel electrode 9a and a storage capacitor 70.

The electro-optical device can include a data-line driving circuit 101, a scanning-line driving circuit 104, and a sampling circuit 301, disposed in peripheral regions around the image display area. The data-line driving circuit 101 supplies sampling-circuit driving signals sequentially to the sampling circuit 301 via sampling-circuit driving signal lines 114. The sampling circuit 301 can include a plurality of single-channel TFTs 302 that functions as switches for sampling. Each of the single-channel TFTs 302 has a source connected to a lead wire 116 extending from an image signal line 115, a drain connected to a data line 6a, and a gate connected to a sampling-circuit driving signal line 114. The sampling circuit 301 simultaneously samples image signals VID1 to VID6 on image signal lines 115 at a timing according to the sampling-circuit driving signal supplied from the data-line driving circuit 101, and simultaneously supplies the image signals VID1 to VID6 to six data lines 6a. Thus, sampled image signals S1, S2, . . . Sn are written sequentially by groups of six data lines 6a. On the other hand, the scanning-line driving circuit 104 supplies pulsed scanning signals G1, G2, . . . Gm, sequentially line by line, to the scanning lines 113a at specific timing.

In the image display area, the gates of the TFTs 30 receive the scanning signals G1, G2, . . . Gm, sequentially line by line, from the scanning-line driving circuit 104 via the scanning lines 113a. The switches of the TFTs 30, functioning as pixel switching elements, are closed for a certain period, whereby the image signals S1, S2, . . . Sn supplied via the data lines 6a are written to the pixel electrodes 9a at specific timing. The image signals S1, S2, . . . Sn at prescribed levels are written via the pixel electrodes 9a to electro-optical members, for example, liquid crystal members in this case, and are thereby held for a certain period between the pixel electrodes 9a and an opposing electrode formed on an opposing substrate, which will be described later. The liquid crystal members change the orientations and orders of molecules therein according to the levels of voltages applied thereto, thereby modulating lights to assign different intensity levels. In the normally white mode, the transmittance with respect to incident light decreases according to the levels of voltages respectively applied to pixels. In the normally black mode, transmittance with respect to incident light increases according to the levels of voltages respectively applied to pixels. Thus, as a whole, the electro-optical device emits light having a contrast according to the image signals.

In order to prevent leakage of the image signals that are held, storage capacitors 70 are provided respectively in parallel to liquid crystal capacitors formed between the pixel electrodes 9a and the opposing electrode. As will be described later in detail, each of the storage capacitors 70 has a pixel-potential-side capacitor electrode connected to a pixel electrode 9a, and a fixed-potential-side capacitor electrode opposing the pixel-potential-side capacitor electrode via a dielectric film. Part of a capacitor line 300 that is at a fixed potential, disposed in parallel to a scanning line 113, functions as the fixed-potential-side capacitor electrode. Furthermore, as will be described later, redundant wiring of the capacitor line 300 is formed by a lower light-shielding film 111a.

The capacitor line 300 and the lower light-shielding film 111a are electrically connected to a capacitor-line voltage supplying terminal 303 outside the image display area where the pixel electrodes 9a are arranged. Thus, all the capacitor lines 300 and light-shielding films 111a are at a stable fixed potential or a predetermined alternating potential according to a voltage supplied from the capacitor-line voltage supplying terminal 303. Thus, the storage capacitors 70 have favorable characteristics for maintaining potential. The voltage source used may be a positive or negative constant voltage source that supplies a voltage to the data-line driving circuit 101 or to the scanning-line driving circuit 104 that supplies scanning signals to the scanning lines 113a to drive the TFTs 30, or a constant voltage source that supplies a voltage to the opposing electrode of the opposing substrate.

In this embodiment, for example, line inversion driving or 1H inversion driving is executed. In other words, pixel electrodes 9a on a single row are driven by a voltage of the same polarity, and the polarity of voltage applied to pixels on each row is inverted on a field-by-field basis. That is, the polarity of image signals supplied to the image signal lines 115 is inverted on a field-by-field basis. Thus, degradation of the liquid crystal due to application of DC voltages is avoided effectively.

In this exemplary embodiment, referring to FIG. 1, pixel electrodes 9a, respectively indicated by white rectangles, are arranged in an image display area. In a frame-shaped dummy area in the periphery of the image display area, pixel electrodes that function as dummy pixel electrodes 9d, respectively indicated by black rectangles, are arranged. The dummy pixel electrodes 9d are constructed the same as the pixel electrodes 9a. Also, a dummy pixel unit including a dummy pixel electrode 9d, a pixel-switching TFT 30, and a storage capacitor 70 is constructed substantially the same as a pixel unit including a pixel electrode 9a, a pixel-switching TFT 30, and a storage capacitor 70.

Note, however, that in the dummy pixel unit, a dummy-pixel light-shielding film composed of the same film material as the lower light-shielding film 111a is provided in an opening region of each dummy pixel, as will be described later in detail. More specifically, referring to FIG. 1, around the image display area, with respect to each of the edges thereof, dummy pixel electrodes 9d are provided on two columns or two rows. In the dummy area, active matrix driving is executed similarly to the image display area. Thus, regions where liquid crystal is not fully driven, which occur in the proximity of edges of an image display area in active matrix driving, are excluded from the image display area actually used for display.

Accordingly, image is displayed in good quality even in the proximity of the edges of the image display area.

Referring next to FIG. 2, on the TFT array substrate 10 of the electro-optical device, a plurality of transparent pixel electrodes 9a (outlines thereof being indicated by dotted lines 9a') is provided in a matrix shape, and data lines 6a and scanning lines 113a are provided along the vertical and horizontal boundaries of the pixel electrodes 9a.

In this exemplary embodiment, both in the image display area and in the dummy area, the lower light-shielding film 111a is formed in a grating shape in the non-opening regions the respective pixels. The lower light-shielding film 111a is electrically connected to the capacitor lines 300 via contact holes 601 so as to form redundant wiring of the capacitor lines 300. The contact holes 601 may be filled with the same material as the capacitor lines 300 or plugged by another conductive material. Furthermore, the lower light-shielding film 111a is electrically connected to the capacitor-line voltage supplying terminal 303 in the peripheral region, directly or via the capacitor lines 300 (refer to FIG. 1). In the dummy area, similarly to the pixel electrodes 9a in the image display area, a plurality of transparent dummy pixel electrodes 9d is provided, and data lines 6a and scanning lines 113a are provided along the vertical and horizontal boundaries of the dummy pixel electrodes 9d. Furthermore, in the opening regions of the respective pixels in the dummy area, island-shaped dummy-pixel light-shielding films 111d, composed of the same film material as the lower light-shielding film 111a, are provided. That is, in the dummy area, with regard to each of the pixels, a large portion of the opening region is covered by a dummy-pixel light-shielding film 111d except for a slight gap 111s as viewed in plan. The gap 111s is provided along the edges of the opening region, and the width thereof is, for example, on the order of several tenths µm to several µm.

Furthermore, referring to FIG. 2, each of the scanning lines 113a is disposed so as to oppose a channel region 1a' of a semiconductor layer 1a, indicated by an area of dense diagonal lines extending right-upward, and the scanning line 113a functions as a gate electrode. In this embodiment, the scanning line 113a has a larger width in the region that actually functions as a gate electrode. Thus, at each of the intersections of the scanning lines 113a and the data lines 6a, a pixel-switching TFT 30 in which a scanning line 113a that functions as a gate electrode is opposed to a channel region 1a' is provided.

As shown in FIGS. 2 and 3, capacitor lines 300 are formed on scanning lines 113a. The capacitor lines 300 include main portions that extend in a stripe pattern along the scanning lines 113a as viewed in plan, and protruding portions that extend upward and downward as viewed in FIG. 2 along the data lines 6a from the main portions at the intersections of the scanning lines 113a and the data lines 6a.

Each of the capacitor lines 300 is composed of, for example, a conductive light-shielding film including a metal or an alloy. The capacitor line 300 constitutes an example of an upper light-shielding film, and also functions as a fixed-potential-side capacitor electrode. The capacitor line 300 is composed of an elemental metal, an alloy, a metal silicide, a polysilicide, a lamination of these materials, or the like, including at least one high melting point metal such as titanium (Ti), chromium (Cr), tungsten (W), tantalum (Ta), or molybdenum (Mo). The capacitor line 300 may include other metals such as aluminum (Al), silver (Ag), gold (Au), or copper (Cu). Alternatively, the capacitor 300 may have a multilayer structure including, for example, a lamination of a first layer composed of a conductive polysilicon film and a second layer composed of a metal silicide film including a high melting point metal.

Intermediate layers (i.e., barrier layers) 71 are disposed so as to oppose capacitor lines 300 via dielectric films 75. Each of the intermediate layers 71 functions as a pixel-potential-side capacitor electrode of a storage capacitor 70, and also as an intermediate conductive layer that interconnects a pixel electrode 9a and a heavily doped drain region 1e of a TFT 30.

As described above, according to this embodiment, each storage capacitor 70 is formed by an intermediate layer 71 that functions as a pixel-potential-side capacitor electrode, connected to a heavily doped region 1e of a TFT 30 and to a pixel electrode 9a, and by part of a capacitor line 300 that functions as a fixed-potential-side capacitor electrode, the intermediate layer 71 and the part of the capacitor line 300 being opposed to each other via a dielectric film 75.

The data lines 6a extending vertically in FIG. 2 and the capacitor lines 300 extending horizontally in FIG. 2 cross each other, forming a grating-shaped upper light-shielding film as viewed in plan over the TFTs 30 on the TFT array substrate 10, the upper light-shielding film defining opening regions of the respective pixels.

On the other hand, under the TFTs 30 on the TFT array substrate 10, the grating-shaped lower light-shielding film 111a electrically connected to the capacitor lines 300 via the contact holes 601 (refer to FIG. 2) not shown in FIG. 3 is provided. Similarly to the capacitor lines 300, the light-shielding film 111a, which functions as redundant wiring of the capacitor lines 300, can be implemented by a film of various metals or the like. The lower light-shielding film 111a, which functions as redundant wiring of the capacitor lines 300, serves to reduce resistance of the capacitor lines 300, and to prevent malfunctioning of the apparatus as a whole due to partial disconnection or defect of the capacitor lines 300. Furthermore, since the lower light-shielding film 111a and the capacitor lines 300 shield the TFTs 30 from lights coming from upward and downward, occurrence of a light leak current due to an intense incident or returning light falling on the TFTs 30 is prevented effectively.

As shown in FIGS. 2 and 3, each of the pixel electrodes 9a is electrically connected to a heavily doped drain region 1e of a semiconductor layer 1a via an intermediate layer 71 through contact holes 83 and 85.

Each of the data lines 6a is electrically connected via a contact hole 81 to a heavily doped source region 1d of a semiconductor layer 1a composed of, for example, a polysilicon film. Alternatively, each of the data lines 6a may be connected to a heavily doped source region 1a via an intermediate layer.

Referring to FIGS. 2 and 3, the electro-optical device can include a transparent TFT array substrate 10 and a transparent opposing substrate 20 opposing the TFT array substrate 10. The TFT array substrate 10 is implemented by, for example, a quartz substrate, a glass substrate, or a silicon substrate, and the opposing substrate 20 is implemented by, for example, a glass substrate or a quartz substrate.

As shown in FIG. 3, pixel electrodes 9a are formed on the TFT array substrate 10, and an oriented film 16 that has undergone specific orientation processing such as rubbing is provided over the pixel electrodes 9a. The pixel electrodes 9a are composed of, for example, transparent conductive films such as indium tin oxide (ITO) films. The oriented film 16 is composed of, for example, an organic film, such as a polyimide film.

On the opposing substrate 20, an opposing electrode 21 is formed over an entire surface thereof, and an oriented film 22 that has undergone specific orientation processing such as rubbing is provided under the opposing electrode 21. The opposing electrode 21 is composed of, for example, a transparent conductive film such as an ITO film. The oriented film 22 is composed of, for example, an organic film such as a polyimide film.

Similarly to the TFT array substrate 10, on the opposing substrate 20, a light-shielding film 23 is formed in regions other than the opening regions of the respective pixels, forming a grating pattern or a stripe pattern. Thus, the light-shielding film 23 associated with the opposing substrate 20, together with the capacitor lines 300 and the data lines 6a constituting the upper light-shielding film, further prohibits light coming from the side of the opposing substrate 20 from entering the channel regions 1a' and adjacent regions. Furthermore, the light-shielding film 23 associated with the opposing substrate 20, when at least a surface thereof that is irradiated with incident light is implemented by a film having high reflectance, serves to suppress temperature rise of the electro-optical device. Preferably, the light-shielding film 23 associated with the opposing substrate 20 is provided, as viewed in plan, in a region more inner than a light-shielding layer formed by the capacitor lines 300 and the data lines 6a. Thus, light is blocked and temperature rise is suppressed by the light-shielding film 23 associated with the opposing substrate 20 without reducing the aperture ratios of the pixels.

Between the TFT array substrate 10 and the opposing substrate 20 disposed such that the pixel electrodes 9a and the opposing electrode 21 oppose each other, liquid crystal, which is an example of electro-optical material, is encapsulated in a space surrounded by a sealing member described later, forming a liquid crystal layer 50. When no electric field is applied by the pixel electrodes 9a, the liquid crystal layer 50 exhibits a predetermined orientation according to the oriented films 16 and 22. The liquid crystal layer 50 is composed of, for example, a single type of nematic liquid crystal or a combination of several types of nematic liquid crystals. The sealing member is a bonding agent composed of, for example, a photo-curable resin or a thermo-setting resin, for bonding the TFT array substrate 10 and the opposing substrate 20 at the edges thereof. The sealing member includes gap members, such as glass fibers or glass beads, for providing a specific distance between the substrates.

Furthermore, a base insulating film 12 is provided under the pixel-switching TFTs 30. The base insulating film 12 insulates the layer of the TFTs 30 from the layer of the lower light-shielding film 111a. Furthermore, since the base insulating film 12 is formed over an entire surface of the TFT array substrate 10, the base insulating film 12 prevents variation in the characteristics of the pixel-switching TFTs 30 due to inadequate polishing of the surface or dirt remaining after cleaning.

Referring to FIG. 3, a pixel-switching TFT 30 has a lightly doped drain (LDD) structure. More specifically, a pixel-switching TFT 30 has a scanning line 113a, a channel region 1a' of a semiconductor layer 1a in which a channel is formed by an electric field generated by the scanning line 113a, an insulating film 2 including a gate insulating film that insulates the scanning line 113a from the semiconductor layer 1a, a lightly doped source region 1b and a lightly doped drain region 1c of the semiconductor layer 1a, and a heavily doped source region 1d and a heavily doped drain region 1e of the semiconductor layer 1a.

Over the scanning line 113a, a first interlayer insulating film 41 through which a contact hole 81 extends to the heavily doped source region 1d and a contact hole 83 extends to the heavily doped drain region 1e is formed.

Over the first interlayer insulating film 41, an intermediate layer 71 and a capacitor line 300 are formed. Over the intermediate layer 71 and the capacitor line 300, a second interlayer insulating film 42 through which the contact hole 81 and a contact hole 85 extend is formed.

Over the second interlayer insulating film 42, a data line 6a is formed. Over the data line 6a, a third interlayer insulating film 43 through which the contact hole 85 extends to the intermediate layer 71 is formed. A pixel electrode 9a is provided on a top surface of the third interlayer insulating film 43 constructed as described above.

Next, the overall construction of the exemplary electro-optical device including pixel units constructed as described above will be described with reference to FIGS. 4 and 5. FIG. 4 is a plan view of the TFT array substrate 10 with elements provided thereon, as viewed from the opposing substrate 20. FIG. 5 is a sectional view taken along a line H–H' in FIG. 4.

As shown in FIG. 4, on the TFT array substrate 10, a sealing member 52 is provided along the edges of the TFT array substrate 10. Furthermore, a light-shielding film 53 that forms as a frame defining the periphery of the image display area 10a is provided inside and along the sealing member 52. In a region outside the sealing member 52, a data-line driving circuit 101 for supplying image signals to the data lines 6a at specific timing to drive the data lines 6a, and external circuit connecting terminals 102, are provided along an edge of the TFT array substrate 10. Also, along two edges adjacent to the above-mentioned edge of the TFT array substrate 10, scanning-line driving circuits 104 for supplying scanning signals to the scanning lines 113a at specific timing to drive the scanning lines 113a are provided. If delay of scanning signals supplied to the scanning lines 113a does not matter, a scanning-line driving circuit 104 along one edge suffices. Furthermore, data-line driving circuits 101 may be disposed on both sides along edges of the image display area 10a. Furthermore, a plurality of wires 105 for interconnecting the scanning-line driving circuits 104 disposed on both sides of the image display area 10a is disposed along the remaining edge of the TFT array substrate 10. Furthermore, on at least one corner of the opposing substrate 20, a conductive member 106 for providing electrical conduction between the TFT array substrate 10 and the opposing substrate 20 is provided. Furthermore, as shown in FIG. 5, the opposing substrate 20 has substantially the same outline as the sealing member 52 shown in FIG. 4, and the opposing substrate 20 is fixed to the TFT array substrate 10 by the sealing member 52.

On the TFT array substrate 10, in addition to the data-line driving circuit 101, the scanning-line driving circuits 104, and other associated parts, a precharging circuit for supplying precharging signals at a predetermined voltage level to data lines 6a prior to image signals, a testing circuit for testing the quality or defect of the electro-optical device during manufacturing or at the time of shipping, or the like, may be provided.

Next, the construction and effect of the dummy-pixel light-shielding film 111d in the dummy area will be described with reference to FIG. 6.

As shown in FIG. 6, in this exemplary embodiment, island-shaped dummy-pixel light-shielding films 111d are provided for the respective pixels in the dummy area, and large portions of the opening regions of the dummy-pixel electrodes 9d are covered except for slight gaps 111s. Thus, even when (i) a diagonal component in incident light that enters from the sides of the capacitor lines 300, the data lines 6a, and the frame-shaped light-shielding film 23 when strong light is incident from upward as viewed in FIGS. 3 and 5, for example, in the case of a projector, (ii) a diagonal component in returning light such as light reflected from a bottom surface of the TFT array substrate 10, incident from downward as viewed in FIGS. 3 and 5, or (iii) multiple reflection or stray light that occurs in the multilayer structure of the TFT array 10, enters the dummy area, the dummy-pixel light-shielding films 111d effectively suppress these components from entering display light through the opening regions of the dummy-pixel electrodes 9d.

Furthermore, in this exemplary embodiment, the dummy-pixel light-shielding films 111d are formed as island-shaped segments for the respective pixels. Thus, stress that occurs in the proximity of the dummy-pixel light-shielding films 111d due to a thermal history on the TFT array substrate 10 is alleviated, and this serves to prevent occurrence of cracks. Each of the gaps 111s has only a width on the order of several μm along the edges of the opening region of a dummy pixel, the opening region having a diagonal on the order of ten to twenty μm. Thus, the dummy-pixel light-shielding films 111d sufficiently block light.

Furthermore, in this exemplary embodiment, the dummy-pixel light-shielding films 111d are formed directly on the flat surface of the TFT array substrate 10. Thus, light reflected by the surface of the dummy-pixel light-shielding films 111d does not a have interference pattern or the like that occurs due to concavities and convexities on the reflecting surface.

In other words, the dummy-pixel light-shielding films 111d are very favorable for suppressing degradation in picture quality due to interference by light reflected from the surface thereof or by diffracted light.

The dummy-pixel light-shielding films 111d, even at floating potentials, do not substantially cause negative effect on the TFTs 30, the data lines 6a, the scanning lines 113a,and other associated parts since the dummy-pixel light-shielding films 111d are disposed at an interlayer distance via the base insulating film 12 from other conductive layers or semiconductor layers forming the TFTs 30, the data lines 6a, the scanning lines 113a, and other associated parts.

Preferably, in this exemplary embodiment, the data-line driving circuit 101 and the sampling circuit 301, forming an example of image-signal supplying means according to the present invention, supplies intermediate-level image signals to the dummy pixel electrodes 9d. For example, when 5 V is used to display black in the normally white mode, intermediate-level image signals on the order of 2 to 4 volts are supplied as dummy image signals. Thus, occurrence of white ghost in the proximity of the edges of the image display area adjacent to the dummy area is suppressed. This effect is particularly prominent when a plurality of data lines 6a is simultaneously driven using serial-parallel conversion, as shown in FIG. 1. As described above, by supplying intermediate-level image signals as dummy image signals in the embodiment described above, the picture quality in the proximity of the edges of the image display area is further improved.

According to this exemplary embodiment, degradation of picture quality in the proximity of edges of the image display area due to light penetration or light leakage in the dummy area is suppressed. Particularly, in the case of a projector, edges of a projected image can be displayed in clear black or gray.

In the embodiment described with reference to FIGS. 1 to 6, instead of providing the data-line driving circuit 101 and the scanning-line driving circuit 104 on the TFT array substrate 10, the data-line driving circuit 101 and the scanning-line driving circuit 104 may be electrically and mechanically connected to a driving LSI mounted on a TAB (tape automated bonding) substrate, via an anisotropic film disposed in the periphery of the TFT array substrate 10. Furthermore, on the light-incident side of the opposing substrate 20 and the light-emitting side of the TFT array substrate 10, a polarization film, a retardation film, a polarization plate, or the like, is disposed in a predetermined direction in accordance with operation mode such as twisted nematic (TN) mode, super twisted nematic (STN) mode, vertically aligned (VA) mode, or polymer dispersed liquid crystal (PDLC) mode, and in accordance with distinction between normally white mode and normally black mode.

When the electro-optical device according to the embodiment described above is used in a projector, three electro-optical devices are used as light bulbs for RGB, respectively. The respective light bulbs receive projected lights of the respective colors separated by dichroic mirrors for RGB color separation. Thus, in the embodiment described above, color filters are not provided on the opposing substrate 20. Alternatively, however, RGB color filters with protective films may be formed on the opposing substrate 20 in specific regions opposing the pixel electrodes 9a. Accordingly, the electro-optical device according to the embodiment can be applied to direct viewing or reflection color electro-optical devices other than projectors. Alternatively, a color filter layer may be formed of color resist or the like under the pixel electrodes 9a. Accordingly, the efficiency of concentration of incident light is increased, so that the electro-optical device achieves increased brightness. Alternatively, dichroic filters for generating RGB colors may be formed by providing a number of interfering layers having different refractive indices on the opposing substrate 20.

Figure 7:
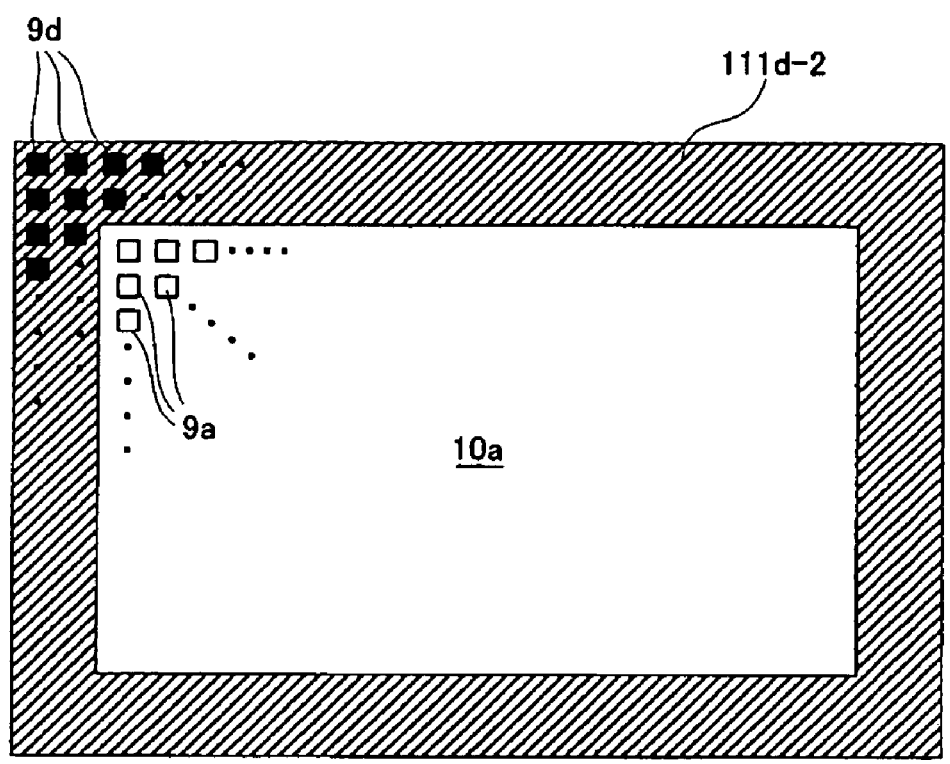
FIG. 7 is a plan view showing a planar pattern of a dummy-pixel light-shielding film in a dummy area in a second embodiment of the invention.

Next, a second exemplary embodiment of the invention will be described with reference to FIG. 7. FIG. 7 is a plan view showing a planar pattern of a dummy-pixel light-shielding film in a dummy area in the second exemplary embodiment.

In the second exemplary embodiment, as compared with the first exemplary embodiment described above, the planar pattern of a dummy-pixel light-shielding film differs. The second exemplary embodiment is otherwise the same as the first exemplary embodiment. Thus, in FIG. 7 relating to the second exemplary embodiment, parts corresponding to those shown in FIGS. 1 to 6 in relation to the first exemplary embodiment are designated by the same numerals, and descriptions thereof will be omitted.

Referring to FIG. 7, in an electro-optical device according to the second exemplary embodiment, a dummy-pixel light-shielding film 111d-2 is formed over the entire dummy area. The dummy-pixel light-shielding film 111d-2 functions as redundant wiring of the capacitor lines 300. Since the capacitor lines 300 are all connected to the same capacitor-line voltage supplying terminal 303, even when a lower light-shielding film 11b is formed over the entire dummy area, the lower light-shielding film 11b functions properly as redundant wiring of the capacitor lines 300. According to this embodiment, the opening regions of the respective dummy pixels are fully covered by the dummy-pixel light-shielding film 111d-2 formed over the entire dummy area. Thus, light penetration or light leakage in the dummy area is more fully prevented.

Figure 8:
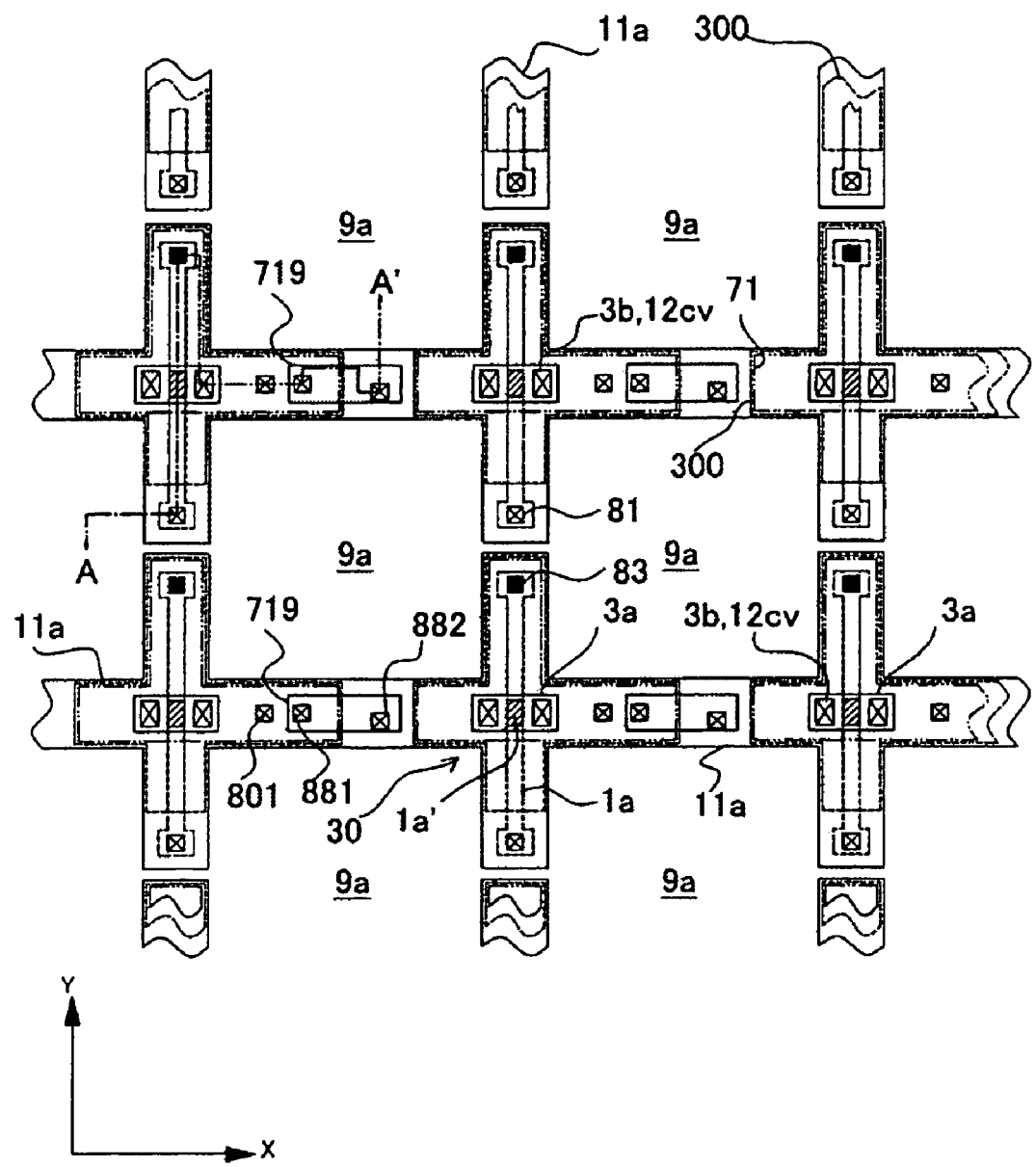
FIG. 8 is a plan view (showing lower layers) of a plurality of adjacent pixels on a TFT array substrate in a third exemplary embodiment of the invention, where data lines, scanning lines, pixel electrodes, and other associated parts are formed.
Figure 9:
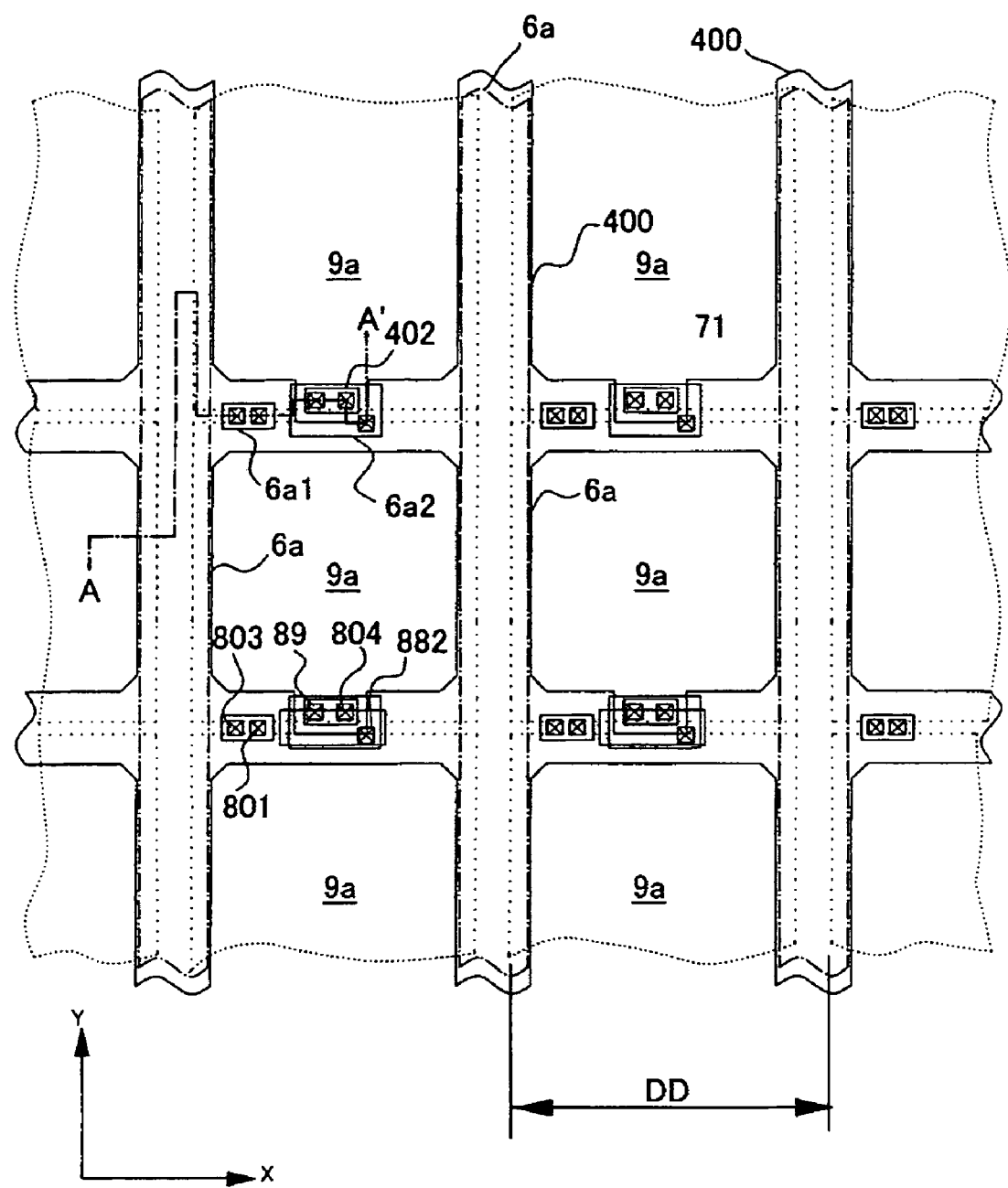
FIG. 9 is a plan view (showing upper layers) of a plurality of adjacent pixels on the TFT array substrate in the third exemplary embodiment, where data lines, scanning lines, pixel electrodes, and other associated parts are formed.
Figure 10:
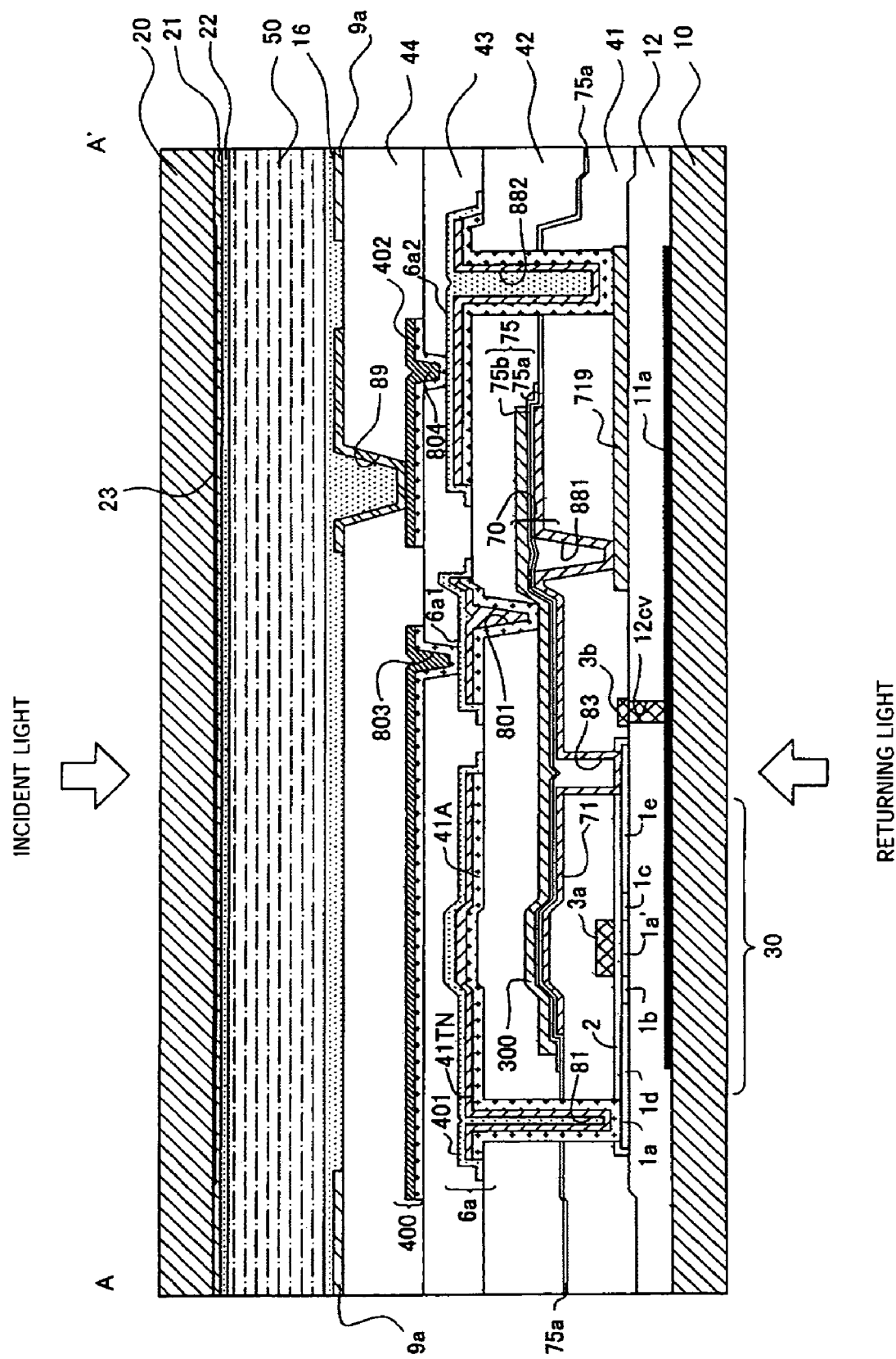
FIG. 10 is a sectional view of the lower and upper layers shown in FIGS. 8 and 9, taken along a line A–A'.
Figure 11:
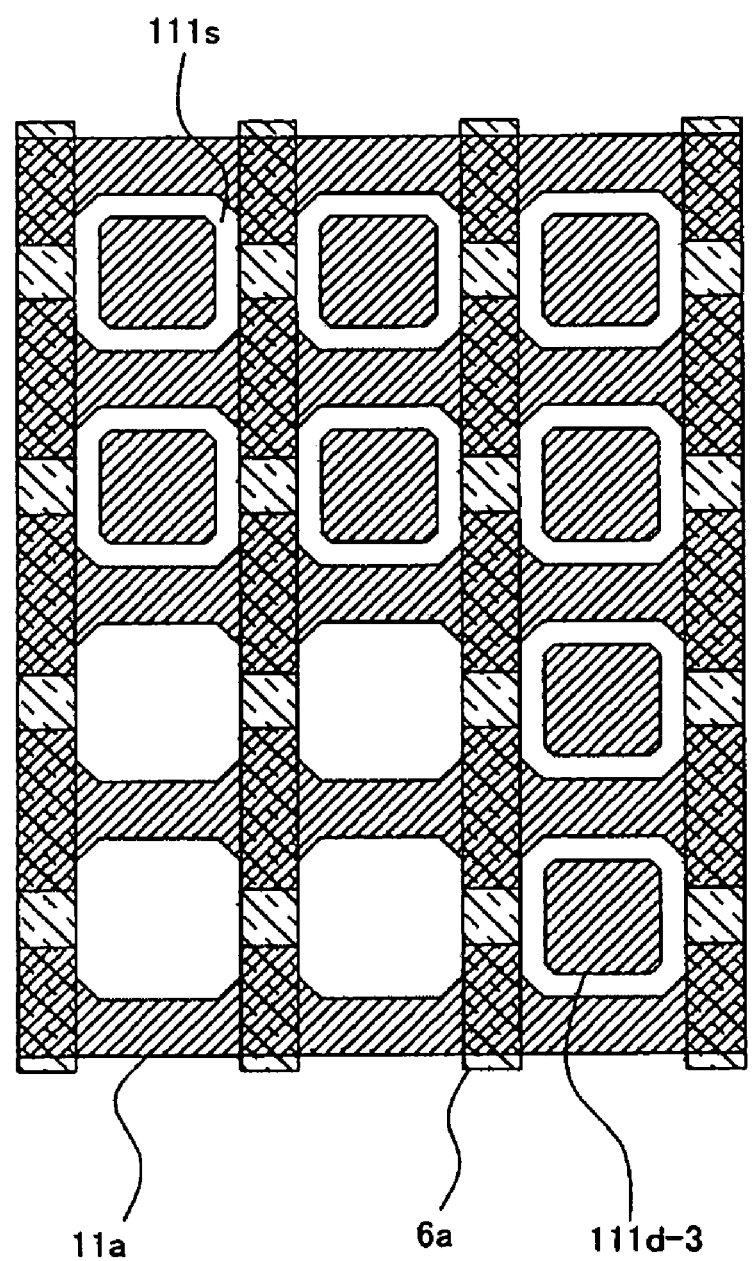
FIG. 11 is a plan view showing a planar pattern of lower light-shielding films in a dummy area in the third exemplary embodiment.

Next, a third exemplary embodiment of the invention will be described with reference to FIGS. 8 to 11. FIGS. 8 and 9 are plan views of a plurality of adjacent pixels on a TFT array substrate where data lines, scanning lines, pixels electrodes, and other associated parts are formed. FIGS. 8 and 9 are plan views showing parts corresponding to those shown in FIG. 2. FIGS. 8 and 9 respectively show lower layers and upper layers of a multilayer structure described later. FIG. 10 is a sectional view of the multilayer structure shown in FIGS. 8 and 9, taken along a line A–A'. In FIG. 10, layers and parts are shown in different scales so as to allow recognition of the layers and the parts in the figure. FIG. 11 is a plan view showing a planar pattern of lower light-shielding films in a dummy area in the third embodiment.

In FIGS. 8 to 11 relating to the third embodiment, parts corresponding to those shown in FIGS. 1 to 6 in relation to the first embodiment are designated by the same numerals, and descriptions thereof will be omitted. A dummy-pixel light-shielding film is omitted in FIGS. 8 and 9, and is shown in FIG. 11 together with scanning lines 11a and other associated parts.

Referring to FIGS. 8 to 10, scanning lines 11a are composed of, for example, a light-shielding film composed of a high melting point metal or the like. Each of the scanning lines 11a is electrically connected via a contact hole 12cv to a gate electrode 3a opposing a channel region 1a', and the gate electrode 3a is included in the scanning line 11a. That is, at each of the intersections of the gate electrodes 3a and the data lines 6a, a pixel-switching TFT 30 is formed by opposing the gate electrode 3a included in the scanning line 11a to the channel region 1a'. Thus, the TFT 30 (except for the gate electrode 3a) exists between the gate electrode 3a and the scanning line 11a.

As shown in FIG. 10, the TFT array substrate 10 includes, from the bottom, a first layer including the scanning lines 11a, a second layer including the TFTs 30 including the gate electrodes 3a, a third layer including the storage capacitors 70, a fourth layer including the data lines 6a, a fifth layer including capacitor lines 400, and a sixth layer (uppermost layer) including the pixel electrodes 9a and the oriented film 16. Furthermore, a base insulating film 12 is provided between the first layer and the second layer, a first interlayer insulating film 41 is provided between the second layer and the third layer, a second interlayer insulating film 42 is provided between the third layer and the fourth layer, a third interlayer insulating film 43 is provided between the fourth layer and the fifth layer, and a fourth interlayer insulating film 44 is provided between the fifth layer and the sixth layer, preventing short circuiting among the elements described above. Furthermore, the insulating films 12, 41, 42, 43, and 44 have contact holes or the like for electrically connecting the data lines 6a with the heavily doped source regions 1d in the semiconductor layers 1a of the TFTs 30. The elements will be described in order from the bottom. Of the layers mentioned above, the first to third layers are shown in FIG. 8 as lower layers, and the fourth to sixth layers are shown in FIG. 9 as upper layers.

The first layer can include the scanning lines 11a. The scanning lines 11a are composed of, for example, a single metal, alloy, metal silicide, a polysilicide, or a lamination these material, including at least one high melting point metal such as Ti, Cr, W, Ta, or Mo, or are composed of a conductive polysilicon. The scanning lines 11a have a stripe pattern as viewed in plan, extending in the X direction in FIG. 8. More specifically, the stripe-patterned scanning lines 11a include main portions extending in the X direction in FIG. 8, and protruding portions extending in the Y direction in FIG. 8 along the data lines 6a or the capacitor lines 400. The protruding portions extending from adjacent scanning lines 11a are not connected to each other, so that the scanning lines 11a are separated one by one.

In the second layer, the TFTs 30 including the gate electrodes 3a are provided. In this embodiment, intermediate electrodes 719 are formed of the same film material as the gate electrodes 3a. As shown in FIG. 8, the intermediate electrodes 719, as viewed in plan, have island-like shapes located substantially at the centers of edges of the respective pixel electrodes 9a extending in the X direction. Since the intermediate electrodes 719 and the gate electrodes 3a are formed of the same film material, for example, if the latter is composed of a conductive polysilicon film, the former is also composed of a conductive polysilicon film.

Over the scanning lines 11a and under the TFTs 30, a base insulating film 12 composed of, for example, a silicon oxide film, is provided. The base insulating film 12, on both sides of the semiconductor layer 1a as viewed in plan, has groove-shaped contact holes 12cv extending along the length of the channel of the semiconductor layer 1a along the data lines 6a. The gate electrodes 3a laminated above the contact holes 12cv have portions that are concave downward, associated with the contact holes 12cv. The gate electrodes 3a are formed so as to fill the contact holes 12cv, so that sidewalls 3b formed integrally with the gate electrodes 3a extend from the gate electrodes 3a. Thus, as shown in FIG. 8, the semiconductor layers 1a of the TFTs 30 are covered from a lateral side as viewed in plan, so that light incident from at least that side is suppressed. The sidewalls 3b are formed so as to fill the contact holes 12cv, and lower ends thereof are in contact with the scanning lines 11a. Since the scanning lines 11a are formed in a stripe pattern as described earlier, gate electrodes 3a and scanning lines 11a on a given row are always at the same potential as far as the row is concerned.

The third layer includes the storage capacitors 70. In this embodiment, as will be understood from the plan view shown in FIG. 8, the storage capacitors 70 are formed so as not to reach a light transmitting area substantially corresponding to an area where the pixel electrodes 9a are formed. That is, the storage capacitors 70 are contained in a light-shielding area. Thus, the electro-optical device maintains a relatively large aperture ratio, allowing display of brighter images. As shown in FIG. 10, in this embodiment, the dielectric film 75 has a two-layer structure including a lower layer composed of a silicon oxide film 75a and an upper layer composed of a silicon nitride film 75b. The upper silicon nitride film 75b is patterned so as to have a size somewhat larger than the size of the lower electrode that functions as a pixel-potential-side capacitor electrode, and it is contained in the light-shielding area (non-opening area). Although the dielectric film 75 has a two-layer structure in this embodiment, the dielectric film 75 may have a three-layer structure including a silicon oxide film, a silicon nitride film, and a silicon nitride film, or a lamination of more than three layers. Obviously, the dielectric film 75 may also have a single-layer structure.

The first interlayer insulating film 41 has contact holes 881 that electrically connect the intermediate electrodes 719 with the lower electrodes 71 that function as pixel-potential-side capacitor electrodes of the storage capacitors 70. Furthermore, the first interlayer insulating film 41 has contact holes 882 that electrically connect the intermediate electrodes 719 with second intermediate electrodes 6a2 described later, the contact holes 882 penetrating through a second interlayer insulating film described later.

The fourth layer includes the data lines 6a. As shown in FIG. 10, the data lines 6a have a three-layer structure including, from the bottom, an aluminum layer (indicated by 41A in FIG. 10), a titanium nitride layer indicated by 41TN in FIG. 10), and a silicon nitride layer (indicated by 401 in FIG. 10). The silicon nitride film is patterned so as to have a somewhat larger size and to thus cover the lower aluminum layer and the titanium nitride layer.

The fourth layer includes capacitor-line intermediate layers 6a1 and second intermediate electrodes 6a2 composed of the same film material as the data lines 6a. As shown in FIG. 9, as viewed in plan, the capacitor-line intermediate layers 6a1 and the second intermediate electrodes 6a2 are formed so as to form patterned segments instead of forming a continuous planar shape with the data lines 6a. The capacitor-line intermediate layers 6a1 and the second intermediate electrodes 6a2, formed of the same film material as the data lines 6a, have a three-layer structure including, from the bottom, an aluminum layer, a titanium nitride layer, and a plasma nitride film layer.

The second interlayer insulating film 42 has contact holes 801 that electrically connect the capacitor-line intermediate layers 6a1 with the capacitor electrodes 300 that function as upper electrodes of the storage capacitors 70. Furthermore, the second interlayer insulating film 42 has the contact holes 882, mentioned earlier, which electrically connect the second intermediate electrodes 6a2 with the intermediate electrodes 719.

The fifth layer includes the capacitor lines 400 that function as upper light-shielding films in this exemplary embodiment. As shown in FIG. 9, the capacitor lines 400, as viewed in plan, are arranged so as to form a grating shape extending in the X and Y directions. The portions of the capacitor lines 400 extending in the Y direction have larger widths than the data lines 6a so as to cover the data lines 6a. The portions extending in the X direction have cutout portions in the proximity of the middle of edges of the respective pixel electrodes 9a in order to provide areas for forming third intermediate electrodes 402 described later.

Furthermore, at the corners of the crossed portions of the capacitor lines 400 extending in the X and Y directions in FIG. 9, substantially triangular potions are provided so as to fill the corners. Since the substantially triangular portions are provided in the capacitor lines 400, the semiconductor layers 1a of the TFTs 30 are effectively shielded from light. More specifically, light that is incident toward the semiconductor layers 1a from diagonally upward is reflected or absorbed by the triangular portions, not reaching the semiconductor layers 1a. The capacitor lines 400 are extended from the image display area 10a where the pixel electrodes 9a are formed to the periphery thereof, and are electrically connected to a constant voltage source, so that the potential thereof is fixed.

The fourth layer includes third intermediate electrodes 402 composed of the same film material as the capacitor lines 400. The third intermediate electrodes 42 provide electrical connection between the second intermediate electrodes 6a2 and the pixel electrodes 9a via contact holes 804 and 89 described below. The capacitor lines 400 and the third intermediate electrodes 402 are patterned as separate segments instead of forming a continuous planar shape. The capacitor lines 400 and the third intermediate electrodes 402 have a two-layer structure including a lower layer composed of aluminum and an upper layer composed of titanium nitride.

The third interlayer insulating film 43 has contact holes 803 that electrically connect the capacitor lines 400 with the capacitor-line intermediate layers 6a1, and contact holes 804 that electrically connect the third intermediate electrodes 402 with the second intermediate electrodes 6a2.

The sixth layer includes, under the pixel electrodes 9a, a fourth interlayer insulating film 44 composed of a film of silicate glass such as NSG, PSG, BSG, or BPSG, preferably, NSG, a silicon nitride film, a silicon oxide film, or the like. The fourth interlayer insulating film 44 has contact holes 89 that electrically connect the pixel electrodes 9a with the third intermediate electrodes 402. The pixel electrodes 9a are connected to the TFTs 30 via the contact holes 89, the third intermediate layer 402, the contact holes 804, the second intermediate layers 6a2, the contact holes 882, the intermediate layers 719, the contact holes 881, the lower electrodes 71, and the contact holes 83.

As shown in FIG. 11, in the electro-optical device according to the third embodiment, the dummy-pixel light-shielding films 111d-3 have an island-like planar pattern similar to octagonal planar pattern (refer to FIGS. 8 and 9) of the opening regions of the respective pixels in the dummy area. The dummy-pixel light-shielding film 111d-3 is formed in the same layer as the scanning lines 11a, and is composed of a film of high melting point metal or the like that is light-shielding and conductive.

According to the third exemplary embodiment, the opening regions of the dummy pixels are covered by the dummy-pixel light-shielding films 111d-3 formed as island-like segments. Thus, stress that occurs in the proximity of the dummy-pixel light-shielding films 111d-3 due to a thermal history during manufacturing processes is alleviated, and this serves to prevent occurrence of cracks. Furthermore, since the island-shaped lower light-shielding films 111d-3 similar to the opening regions are formed even though gaps 111s having a width on the order of several μm are provided along the edges of the opening regions, light is blocked substantially the same as in the second embodiment where the opening regions are entirely covered. That is, the dummy-pixel light-shielding films 111d-3 sufficiently block light in the dummy area.

Furthermore, since the dummy-pixel light-shielding films 111d-3 are island shaped, it is possible to insulate the individual dummy-pixel light-shielding films 111d-3 from the scanning lines 11a. Thus, it is possible to form both the scanning lines 11a and the dummy-pixel light-shielding films 111d-3 in a single layer using the same light-shielding film material. Since the lower light-shielding films 11c are island shaped, the lower light-shielding films 11c do not cause problems, such as short circuiting the scanning lines 11a that extend in the horizontal direction (i.e., the row direction) in a stripe pattern.

Next, a fourth exemplary embodiment of the invention will be described with reference to FIG. 12. FIG. 12 is a plan view showing a planar pattern of dummy-pixel light-shielding films in a dummy area in the fourth exemplary embodiment.

The fourth exemplary embodiment differs from the first exemplary embodiment described above with respect to the planar pattern of dummy-pixel light-shielding films. The fourth exemplary embodiment is otherwise the same as the first exemplary embodiment. Thus, in FIG. 12 relating to the fourth exemplary embodiment, parts corresponding to those shown in FIGS. 1 to 6 in relation to the first exemplary embodiment are designated by the same numerals, and descriptions thereof will be omitted.

Referring to FIG. 12, in an electro-optical device according to the fourth exemplary embodiment, dummy-pixel light-shielding films 111d-4 are formed as stripe-patterned segments in the dummy area.

According to this embodiment, since the dummy-pixel light-shielding films 111d-4 are formed as stripe-patterned segments, stress that occurs in the proximity of the dummy-pixel light-shielding films 111d-4 due to a thermal history during manufacturing processes is alleviated, and this serves to prevent occurrence of cracks. Furthermore, since the dummy-pixel light-shielding films 111d-4 are formed with gaps 111s having a width as small as on the order of several μm, the dummy-pixel light-shielding films 111d-4 sufficiently block light.

Furthermore, according to this embodiment, since the dummy-pixel light-shielding films 111d-4 extend in the row direction (i.e., the horizontal direction) along the scanning lines, it is possible to form it is possible to form the scanning lines in the same layer as the dummy-pixel light-shielding films 111d-4 so that the dummy-pixel light-shielding films 114d-4 function as part of the scanning lines in the dummy area, similarly to the third embodiment.

Next, a fifth exemplary embodiment of the present invention will be described with reference to FIG. 13. FIG. 13 is a plan view showing a planar pattern of a dummy-pixel light-shielding film in a dummy area in the fifth embodiment.

Referring to FIG. 13, in an electro-optical device according to the fifth embodiment, a dummy-pixel light-shielding film 111d-5 have slits 111s1-1 that are horseshoe-shaped as viewed in plan.

According to this embodiment, since the dummy-pixel light-shielding film 111d-5 has the slits 111s1-1, stress that occurs in the proximity of the dummy-pixel light-shielding film 111d-5 due to a thermal history during manufacturing processes is alleviated, and this serves to prevent occurrence of cracks. Furthermore, since the widths of the slits 111s1-1 are as small as on the order of several μm, the dummy-pixel light-shielding film 111d-5 sufficiently blocks light.

The electrical connection over the entire dummy-pixel light-shielding film 111d-5 is not broken just by forming the slits 111s1-1. Thus, the dummy-pixel light-shielding film 111d-5 can be used as a single wire having a relatively very large wiring capacitance.

Figure 14:
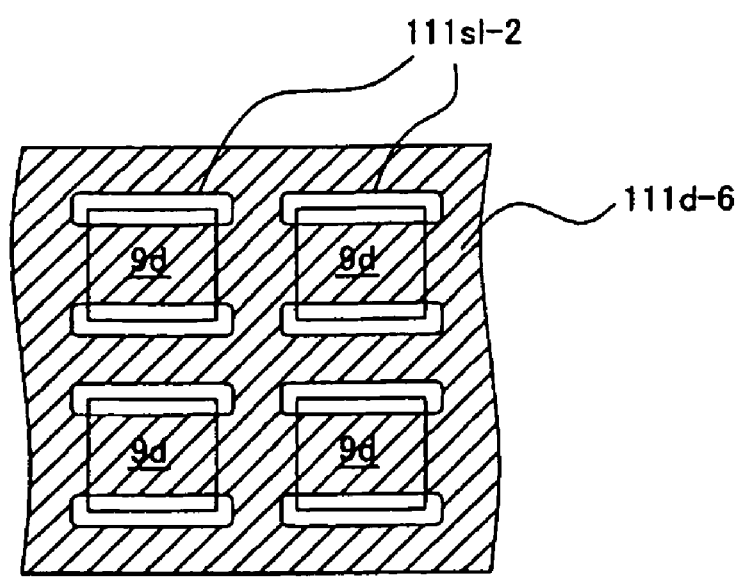
FIG. 14 is a plan view showing a planar pattern of a lower light-shielding film in a dummy area in a sixth exemplary embodiment of the invention.

Next, a sixth exemplary embodiment of the present invention will be described with reference to FIG. 14. FIG. 14 is a plan view showing a planar pattern of a dummy-pixel light-shielding film in a dummy area in the sixth exemplary embodiment.

Referring to FIG. 14, in an electro-optical device according to the sixth embodiment, a dummy-pixel light-shielding film 111d-6 has slits 111s1-2 elongated in the direction along the scanning lines (i.e. the horizontal direction).

According to this embodiment, since the dummy-pixel light-shielding film 111d-6 has the slits 111s1-2, stress that occurs in the proximity of the dummy-pixel light-shielding film 111d-6 due to a thermal history during manufacturing processes is alleviated, and this serves to prevent occurrence of cracks. Furthermore, substantially the same advantages as in the fifth embodiment are achieved by the presence of the slits 111s1-2.

Figure 15:
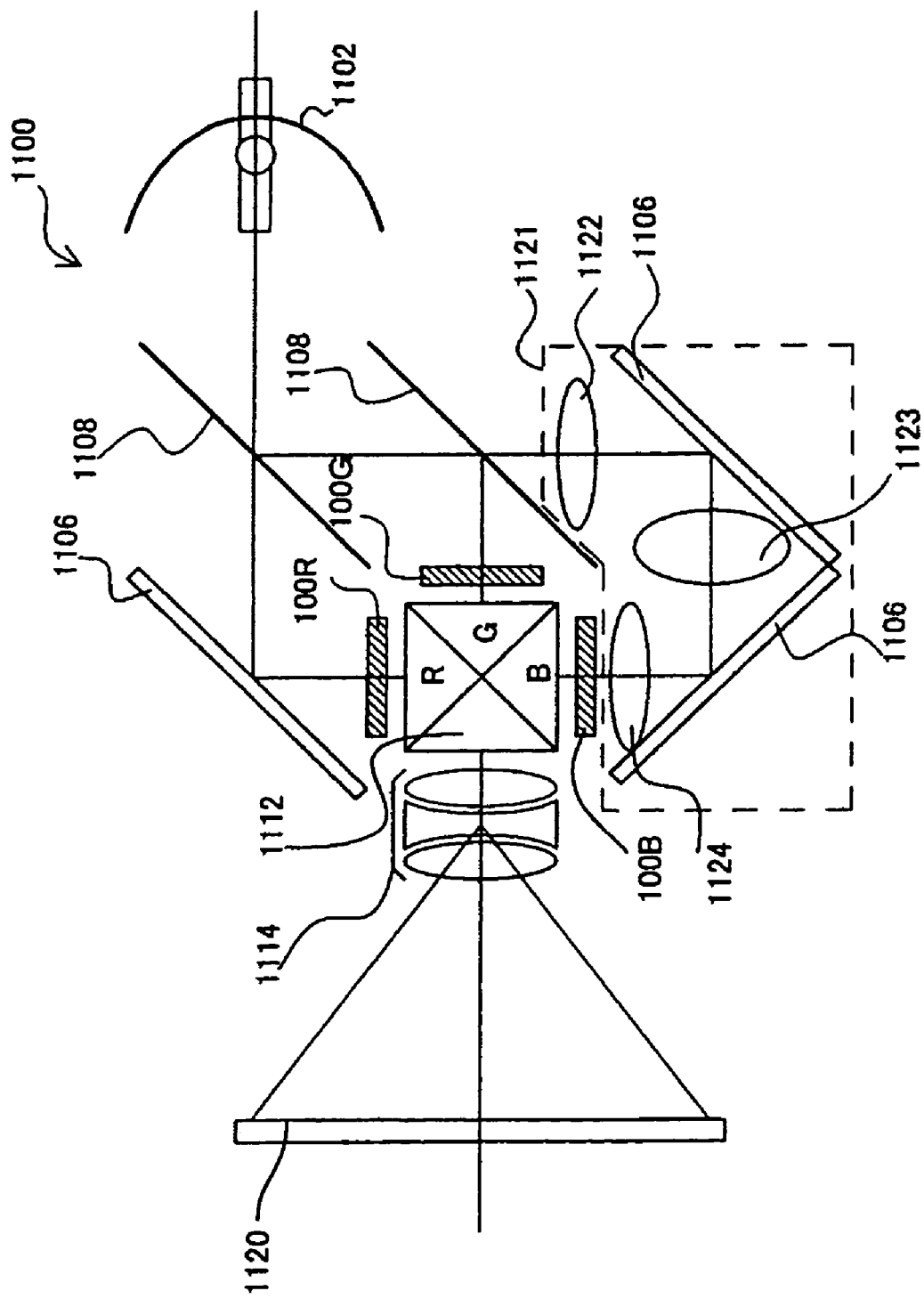
FIG. 15 is a schematic sectional view of a color liquid crystal projector, which is an example of an electronic apparatus according to an exemplary embodiment of the invention.

Next, the overall construction, particularly the optical construction, of a projection color display apparatus according to an embodiment of the present invention, which is an example of an electronic apparatus including light bulbs implemented by the electro-optical devices described above, will be described. FIG. 15 is a schematic sectional view of the projection color display apparatus.

Referring to FIG. 15, a liquid crystal projector 1100, which is an example of a projection color display apparatus according to this embodiment, includes three liquid crystal modules including liquid crystal devices 100 with a driving circuit mounted on a TFT array substrate. The three liquid crystal modules are used as light bulbs 100R, 100G, and 100B for red, green, and blue, respectively. In the liquid crystal projector 1100, when light is projected by a lamp unit 1102 that functions as a white light source, such as a metal halide lamp, the light is separated into light components R, G, and B corresponding to the three primary colors by three mirrors 1106 and two dichroic mirrors 1108, and the light components R, G, and B are directed to the light bulbs 100R, 100G, and 100B, respectively. In particularly, in order to prevent light loss due to a long light path, the light component B is directed via a relaying lens system 1121 including an entrance lens 1122, a relay lens 1123, and an exit lens 1124. Light components corresponding to the three primary colors, respectively modulated by the light bulbs 100R, 100G, and 100B, are recombined by a dichroic prism 1112, and the resulting light is projected on a screen 1120 via a projection lens 1114 to form a color image.

The invention is not limited to the embodiments described above, and modifications thereof can be made as appropriate without departing from the spirit and scope of the invention as understood from the claims and the specification. Electro-optical devices and electronic apparatuses involving such modifications also fall within the technical scope of the invention.

What is claimed is:

1. An electro-optical device, comprising:
a plurality of pixel electrodes provided above a substrate;
at least one of wires and electronic elements that are used to drive the plurality of pixel electrodes;

an image display area where a first set of pixel electrodes among the plurality of pixel electrodes is located;

a dummy area where a second set of pixel electrodes among the plurality of pixel electrodes is located, the dummy area having a frame-like shape and surrounding the image display area; and a dummy-pixel light-shielding film that covers at least part of opening regions of the pixel electrodes that function as dummy pixel electrodes being provided on the substrate, the dummy-pixel light-shielding film being formed on a lower layer side of the at least one of wires and electric elements.

2. The electro-optical device according to claim 1, the dummy-pixel light-shielding film being formed as island-shaped segments in the dummy area.

3. The electro-optical device according to claim 1, the dummy-pixel light-shielding film being formed over the entire dummy area.

4. The electro-optical device according to claim 1, the dummy-pixel light-shielding film being formed as stripe-patterned segments in the dummy area.

5. The electro-optical device according to claim 1, the dummy-pixel light-shielding film having slits.

6. The electro-optical device according to claim 1, the dummy-pixel light-shielding film being formed on a flat surface of the substrate, directly or via a flat interlayer insulating film.

7. The electro-optical device according to claim 1, the at least one of wires and electronic elements including thin-film transistors that control switching of the plurality of pixel electrodes, and scanning lines and data lines coupled to the thin-film transistors, the electro-optical device further including a lower light-shielding film that covers at least channel regions of the thin-film transistors from the lower layer side, and the dummy-pixel light-shielding film being composed of a same film material as the lower light-shielding film.

8. The electro-optical device according to claim 7, the lower light-shielding film also functioning as at least part of the scanning lines.

9. The electro-optical device according to claim 7, further comprising capacitor lines that connect storage capacitors to the pixel electrodes, the capacitor lines being provided on the substrate, the dummy-pixel light-shielding film and the capacitor lines being composed of a same conductive film material.

10. The electro-optical device according to claim 1, the dummy-pixel light-shielding film being at a floating potential.

11. The electro-optical device according to claim 1, further comprising an image-signal supplying device that supplies image signals to the plurality of pixel electrodes, the image-signal supplying device supplying intermediate-level image signals to the pixel electrodes that function as dummy pixel electrodes.

12. The electro-optical device according to claim 1, further comprising:

an opposing substrate disposed opposing the substrate so as to sandwich an electro-optical material; and a frame-shaped light-shielding film disposed on the opposing substrate in an area opposing the dummy area.

13. An electronic apparatus, comprising the electro-optical device according to claim 1.

14. An electro-optical device, comprising:

a plurality of pixel electrodes provided above a substrate;

at least one of wires and electronic elements that are used to drive the plurality of pixel electrodes;

an image display area where a first set of pixel electrodes among the plurality of pixel electrodes is located;

a dummy area where a second set of pixel electrodes among the plurality of pixel electrodes is located, the dummy area having a frame-like shape and surrounding the image display area;

a dummy-pixel light-shielding film that covers at least part of opening regions of the pixel electrodes that function as dummy pixel electrodes being provided on the substrate;

an image-signal supplying circuit that supplies image signals to the data lines, the image-signal supplying circuit being disposed on the substrate;

a scanning-signal supplying circuit that supplies scanning signals to the scanning lines, the scanning-signal supplying circuit being disposed on the substrate; and at least one of the image-signal supplying circuit and the scanning-signal supplying circuit supplying a signal that is output first from an end thereof to a dummy data line or a dummy scanning line that is not connected to a thin film transistor.

15. An electro-optical device, comprising:

a plurality of pixel electrodes provided above a substrate;

at least one of wires and electronic elements that are used to drive the plurality of pixel electrodes;

an image display area where a first set of pixel electrodes among the plurality of pixel electrodes is located;

a dummy area where a second set of pixel electrodes among the plurality of pixel electrodes is located, the dummy area having a frame-like shape and surrounding the image display area;

a dummy-pixel light-shielding film that covers at least part of opening regions of the pixel electrodes that function as dummy pixel electrodes being provided on the substrate, the dummy-pixel light-shielding film being coupled to a constant potential source or a constant potential wire.

* * * * *